(12) United States Patent
Barth

(10) Patent No.: US 6,908,107 B2
(45) Date of Patent: Jun. 21, 2005

(54) OFF-ROAD VEHICLE SAFETY CAGE STRUCTURAL MEMBER ATTACHMENT APPARATUS AND METHOD

(76) Inventor: Lewis D. Barth, P.O. Box 1007, Ault, CO (US) 80610

( * ) Notice: Subject to any disclaimer, the term of this patent is extended or adjusted under 35 U.S.C. 154(b) by 65 days.

(21) Appl. No.: 10/340,451

(22) Filed: Jan. 10, 2003

(65) Prior Publication Data

US 2003/0198509 A1 Oct. 23, 2003

Related U.S. Application Data

(60) Provisional application No. 60/347,284, filed on Jan. 10, 2002.

(51) Int. Cl.$^7$ .............................................. B60R 21/13
(52) U.S. Cl. ................................................... 280/756
(58) Field of Search ................................ 280/756, 762; 296/205, 104; 135/121; 403/292, 293, 386, 395

(56) References Cited

U.S. PATENT DOCUMENTS

| | | | |
|---|---|---|---|
| 2,001,215 A | * 5/1935 | Ruppel | ...................... 52/653.2 |
| 2,557,472 A | * 6/1951 | Rulon | .......................... 74/104 |
| 3,622,177 A | 11/1971 | Notestine et al. | ........... 280/150 |
| 3,918,740 A | 11/1975 | Notestine | .................... 280/150 |
| RE28,876 E | 6/1976 | Notestine et al. | ........... 280/756 |
| D245,496 S | 8/1977 | Wheeler | ...................... D12/16 |
| 4,148,504 A | 4/1979 | Rushing | ..................... 280/756 |
| 4,171,141 A | 10/1979 | Hobrecht | .................... 280/756 |
| D257,673 S | 12/1980 | Milton | ........................ D12/16 |
| D262,790 S | 1/1982 | Bernier | ...................... D12/156 |
| 4,565,402 A | 1/1986 | Hopkins | ........................ 296/3 |
| 4,676,524 A | 6/1987 | Ball et al. | ................... 280/75.6 |
| 4,798,399 A | 1/1989 | Cameron | .................... 280/756 |
| 4,830,402 A | 5/1989 | Matthias et al. | ............ 280/756 |
| 5,048,994 A | 9/1991 | Juan, Sung Y. | ............... 403/51 |
| 5,224,735 A | 7/1993 | Jambor et al. | .............. 280/756 |
| 5,681,126 A | * 10/1997 | Lin | ............................. 403/313 |
| 5,718,454 A | 2/1998 | Harrod | ........................ 280/756 |
| 5,967,691 A | * 10/1999 | Lancelot, III | ............... 403/313 |
| 6,324,988 B1 | * 12/2001 | Svensson | ...................... 104/89 |

OTHER PUBLICATIONS

U.S. Provisional Application No. 60/347,284, filed Jan. 10, 2001, 20 pages and 31 drawings.

"The Ultimate Sport Cage" advertisement, 4–Wheel Drive and Sport Utility Magazine, Mar. 2001, p. 104.

http://www.rockhard4X4parts.com, Jan. 11, 2001, 2 pages (printed Jan. 10, 2002).

"Jeep TJ Sport Cage" advertisement, 4–Wheel Drive and Sport Utility Magazine, Mar. 2001, p. 105.

(Continued)

*Primary Examiner*—Faye M. Fleming
(74) *Attorney, Agent, or Firm*—Santangelo Law Offices P.C.

(57) ABSTRACT

A connector for securely attaching two or more structural members such as metal tubing without requiring welding upon installation and an off-road vehicle occupant protection superstructural framework that incorporates this connector and structural members. In a preferred embodiment one half of a bisected collar-shaped connector to which the end of a first structural member is welded and which may be bolted to the other half of the connector about or around a second structural member is provided. An off-road vehicle superstructure framework useful in protecting occupants in the event of rollover may also incorporate frame mounts and floor mounts and may be installable as an enhancement to a pre-existing roll bar or cage or as an entire cage itself. Another preferred embodiment may be a business method wherein a sport cage of unprecedented strength may shipped unassembled to a customer and installable at home without requiring specialized tools or skills.

64 Claims, 32 Drawing Sheets

OTHER PUBLICATIONS

Inventor's schematic rendition of an attachment apparatus personally known by him to be used in power transmission application, earliest public knowledge unknown.

Inventor's schematic rendition of an attachment apparatus personally known by him to be used in chain link fence application, earliest public knowledge unknown.

* cited by examiner

OFF-ROAD VEHICLE SAFETY CAGE STRUCTURAL MEMBER ATTACHMENT APPARATUS AND METHOD

CROSS-REFERENCES TO RELATED APPLICATIONS

This application claims the benefit of U.S. Provisional Application 60/347,284, filed 10, Jan. 2002, entitled "Bar Connection Apparatus and Method", hereby incorporated by reference.

BACKGROUND

Generally, this invention relates to a structural member connection or attachment system, and apparatus for and techniques of securely but removably attaching one structural member to another without welding or adhesive between the two members. Specifically, the invention focuses on methods (business and otherwise), structural member attachment apparatus and articles of manufacture relating to structural member construction and attachment for "sport cages" (also known as roll cages or safety cages) used to protect occupants of off-road vehicles from injury during accidents that may involve vehicle roll over. However, the article of manufacture, apparatus and methods (business and otherwise) related to bar connection technology as disclosed herein may also find application in fields other than off-road vehicles, such as any field where it is desired to securely fasten one bar to another without a weld or welding between the two, or adhesive, and without requiring drilling, riveting, or other structural modification by the installer.

Structural systems designed to protect occupants of off-road vehicles (such as, e.g., Jeeps™) from injury during roll-over have existed for many years. Roll cages, roll bars, sport cages and safety cages have long been used to protect occupants from injury during roll over by precluding contact of occupants with the driving surface and by enhancing the structural integrity of the vehicle. The various types of structurally-based protection typically consist of rigid metal bars attached to one another and/or the frame of the vehicle in such a fashion as to form a skeletal shell or framework surrounding the space that any riders or driver of the vehicle would occupy.

This skeletal framework may cover this occupant area to varying degrees, depending on the design. Often, factory roll bars (i.e., roll bars that are already attached to the vehicle upon purchase of a new vehicle) provide a minimum amount of framework protection to occupants and vehicle owners or users supplement that minimum protection by adding more structural members to the existing framework. By enhancing this framework, the off-roading experience can be more enjoyable and safer.

Typically, a user who wishes to enhance the protection offered by a factory frame must do so by either taking the entire vehicle to a shop that provides such service or by purchasing a kit from a roll-cage dealer and installing the enhancement kit (also known as a sport cage kit or a roll cage kit) him or herself. Installation of existing kits (other than the kit that is at least one embodiment of the present invention) by either a shop or at home by, for example, a vehicle owner, requires welding. This required welding poses several obstacles to many off-road vehicle enthusiasts who wish to have a factory roll protection system enhanced. Off-road vehicle owners who want to install a roll cage framework enhancement system must have welding tools and skill and, therefore, those who do not have such tools or skill must either incur the expense and time to gain them somehow or must have a shop perform the installation. Those who refuse to part from their off-road vehicles regardless of their lack of skill or tools necessary to perform adequate welds often perform low-quality welds during installation, thereby compromising the safety that would otherwise be afforded by a properly installed roll cage kit. However, usually an off-road vehicle enthusiast desiring a roll cage upgrade but lacking the necessary tools for and skill in welding will opt to resort to an often expensive shop installation. In doing so, the off-road vehicle enthusiast must part with their off-road vehicle for a period of time, forego any satisfaction they might have gained in performing their own installation, and incur an additional labor charge for the shop welding. The present invention overcomes the obstacles posed to users by and problems stemming from the welding requirement of the presently available upgrade, framework enhancement, roll cage or sport cage kits other than the inventive roll over protection kit as disclosed herein.

A further problem related to the "weld" design of other presently available framework enhancement (provided through a shop or with an enhancement kit) has to do with the permanent nature of the weld itself. If repositioning of one structural member with respect to another structural member to which it is welded is desired for whatever reason, such repositioning can only take place after breaking the weld, a lengthy and difficult (and sometimes nearly impossible) process. Thus, if the weld itself is incorrectly located, or it is desired to transfer the roll cage to another vehicle, or if a former off-road enthusiast has lost interest in off-road travel and wishes to remove the enhanced roll cage, such can only be done with great difficulty, if at all. The present invention overcomes the obstacles posed to users by and problems stemming from the permanent nature of the weld of other presently available upgrade, framework enhancement, roll cage, sport cage or safety cage designs.

Further, full sport cage kits and products available today that do not require welding for installation are too large for conventional carrier shipping (such as US Postal Service or United Parcel Service) and therefore may require that a customer drive his or her off-road vehicle to an installment shop, or that the customer somehow transport the large, bulky kit back to his or her home for installation.

Use of a structural member attachment apparatus as provided in the claims is simply unknown in the off-road vehicle sport cage field. Attachment apparatus used in the chain link fence industry, as shown in a figure referenced in the Information Disclosure Citation, discloses an apparatus that has only one part that is establishable externally of the receiving structural member and that therefore, does not allow the entire installation process to take place immediately in the vicinity of the attachment site on the receiving structural member, but instead requires the inconvenient step of slipping a part that surrounds the receiving structural member over an end of the receiving structural member and sliding that surrounding part to the desired attachment on the receiving structural member. A retention apparatus that may find application in power transmission and that is used to connect two shafts having collinear axes is also disclosed in a figure referenced in the Information Disclosure Citation, but, as but a few differences from the inventive technology disclosed herein, it does not have two compressive retention elements, nor does it have compressive generation elements on either side of each compressive retention element. Further, the installation of this attachment apparatus requires slipping the retention element over an end of the receiving structural element and sliding it to the desired attachment site on the receiving structural member. Installation of the inventive apparatus disclosed herein eliminates this inconvenient and time consuming step, a step which often, particularly in off-road sport cage applications, requires disassembly of other structural members.

SUMMARY OF THE INVENTION

The present invention includes a variety of aspects that may be selected in different combinations based upon the particular application or needs to be addressed. In one basic form, the invention discloses a connector that may be used to securely hold two or more structural members together, without requiring welding, drilling or the use of adhesive (i.e., chemical adhesive) during installation such that they will remain connected upon being subjected to high impact forces. The invention discloses a very strong structural member connector that does not require welding for installation. In another basic form, the invention discloses a connector that attaches the terminal end of one structural member (the attaching structural member or element) to at least one other structural member without requiring welding of the two members and without requiring drilling by the installer. In a preferred embodiment, the connector may be made from a strong rigid material such as steel or steel alloy, and may comprise two compressive retention elements that may be two substantially half sections that, when installed, form a collar-type high compression, high friction, collar-shaped attachment between an "attaching" structural member and a "receiving" structural member, each of which may be tubular in a preferred embodiment. The "attaching" structural member may be welded onto the connector and the connector may attach the two structural members to one another upon being compressibly established about or around the outer circumference or outer surface of the "receiving" structural member via bolts that pass through each of the compressive retention elements.

Another embodiment of the invention is methods (business and otherwise), articles of manufacture and apparatus relating to a "sport cage" or safety cage system that incorporates the connector(s) and structural members themselves, specifically in the context of a roll cage or sport cage kit (e.g. a protective framework enhancement kit) for off-road vehicles such as a Jeep™. This "sport cage" system may be added to an existing factory roll bar or roll cage in order to enhance the protection of occupants of the vehicle against injury sustained in the event of a roll-over during a collision, or it may be the entire roll cage. The connectors or attachment apparatus may be compression type collaring attachment devices as described in the above paragraph and serve to allow the attachment of structural members to one another, thus forming a vehicle occupant protection roll cage framework or "cage" about or around the occupants of the vehicle. The structural members themselves may be tubular and made from a strong rigid material such as steel or a steel alloy, or any other material (metallic, such as titanium, aluminum and the like, or otherwise) that is sufficiently capable of withstanding stress that may arise from collisions of the bar with any solid material such as ground or another vehicle.

Another independent embodiment is a dashboard mount (dash mount) or bracket that is located substantially in front of the dash (i.e. between the dashboard structure and a vehicle occupant) instead behind the dashboard (i.e., between the dash structure and the front of the vehicle) and that does not obstruct or impair in any way driver use of the emergency brake or its release handle. The dash mount serves to connect a structural member to the vehicle. The dash mount may have attached to it on the other side of the dash (i.e., behind the dash) the top of a floor mount. The dash mount may constitute an invention unto itself, or it may be incorporated into any of the other embodiments mentioned herein. The dash mount may be connected to the floor mount, both of which may be established such that they do not impair use of or access to the emergency brake pedal and release mechanism. The dash mount and floor mount may be sold together or separately for attachment later.

Another independent aspect of the invention is a sport cage system that is installable without welding. Another independent aspect of the invention is a business method where a roll cage or sport cage for a certain model and year off-road vehicle may be provided via, for example, the United States Postal Service, or United Parcel Service, or in a store to a customer who then installs the sport cage or roll cage by him or herself and without welding. Naturally, as a result of these several different and potentially independent aspects of the invention, the objects of the invention are quite varied.

One of the broad objects of this invention is to provide an off-road vehicle roll cage occupant protection enhancement system that is installable by a customer (or his or her associate) without any welding by the customer during installation and without need for the installer to transport the off-road vehicle to a shop of any sort.

Another broad aspect of this invention is to provide an attachment apparatus and associated method for securely attaching two or more support or structural members to each other without requiring a weld between the members.

Another broad aspect of this invention is to provide an attachment apparatus and associated method for securely attaching two or more support or structural members to each other that does not require the step of slipping the attachment apparatus over the end of the "receiving" structural member and sliding it to the desired attachment location on the "receiving" structural member.

Another broad object of this invention is to provide a business method whereby an off-road vehicle roll cage occupant protection system enhancement kit can be provided to an off-road vehicle owner or enthusiast via shipping or in a store or otherwise and installed by the customer (or his or her associate) without need of any welding by the installer and without the need for transportation of the vehicle to a shop for installation.

Another goal of the invention is to provide a roll or sport cage occupant protection enhancement system that is installable by anyone who has merely a basic understanding of how to read and follow simple directions and use basic, easy to find tools such as, for example, an allen wrench or a socket wrench.

Another object of this invention is to eliminate the "down time" or period during which an off-road vehicle may not be used due to professional in-shop installation (more specifically the welding) required with traditional roll or sport cage occupant protection enhancement system designs and products.

Another goal of the invention is to provide an off-road vehicle occupant protection sport cage kit or product that is transportable using traditional carrier shipping (U.S. Postal Service or United Parcel Service, for example) and installable without the need for welding, thereby obviating the need for in-shop installation and avoiding expensive costs associated with transportation or shipment of a large (approximately 3 feet high with the footprint of the occupant area of an off-road vehicle) item.

Another object of the invention is to reduce the incidence of strength-compromised roll or sport cage occupant protection enhancement systems that arise from inexperienced at-home welders using existing do-it-yourself roll cage installation or upgrade kits that require welding.

Yet another goal of the invention is to provide a roll or sport cage occupant protection enhancement system that is removable and re-installable onto another off-road vehicle. A related goal of the invention is to provide roll or sport cage occupant protection system with structural support members, the relative locations of which may be individually readjustable.

Another goal of the invention is to provide a dash mount that, alone or in conjunction with a floor mount that may be connected to it, does not obstruct or in any way impair driver use of the emergency brake (pedal or other type that may be located to the left of the clutch and/or brake pedal) or of the emergency brake release handle (that may also be located to the left of the clutch and/or brake pedal).

Another goal of the invention is to provide an off-road vehicle occupant protection roll cage framework (that may in whole or in part have been assembled from a kit) that does not require structural modification (such as drilling or riveting) for attachment to pre-existing structures.

Naturally, further objects of the invention are disclosed throughout other areas of the specification and claims.

BRIEF DESCRIPTION OF THE DRAWINGS

The following drawings and descriptions thereof are examples of the inventive technology only, and are not to be construed as limiting the inventive subject matter in any manner.

DETAILED DESCRIPTION OF THE PREFERRED EMBODIMENTS

Figure 1:
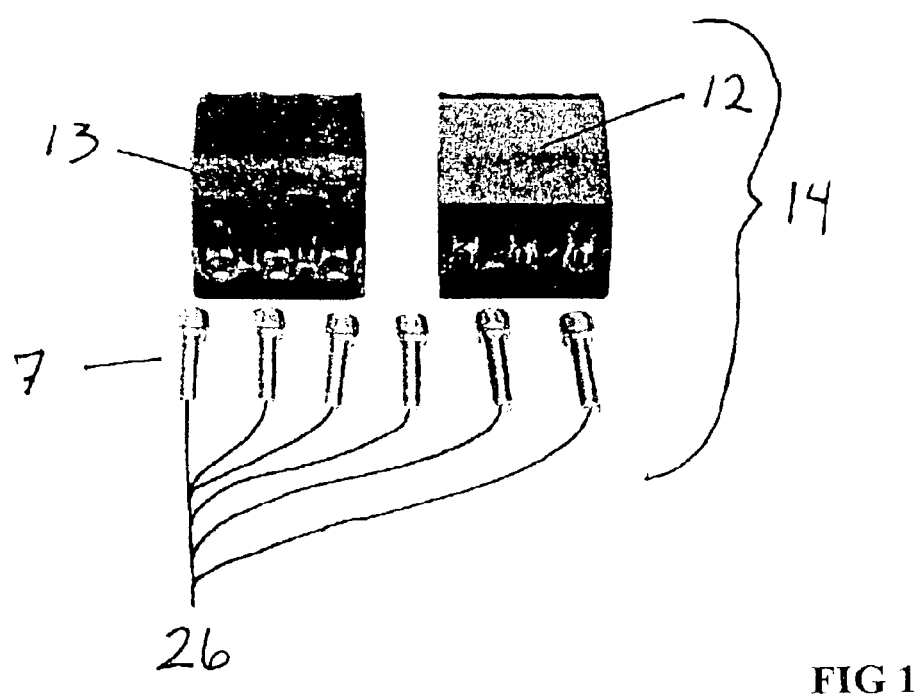
FIG. 1 shows an unattached attachment apparatus without a structural member welded to it.
Figure 2:
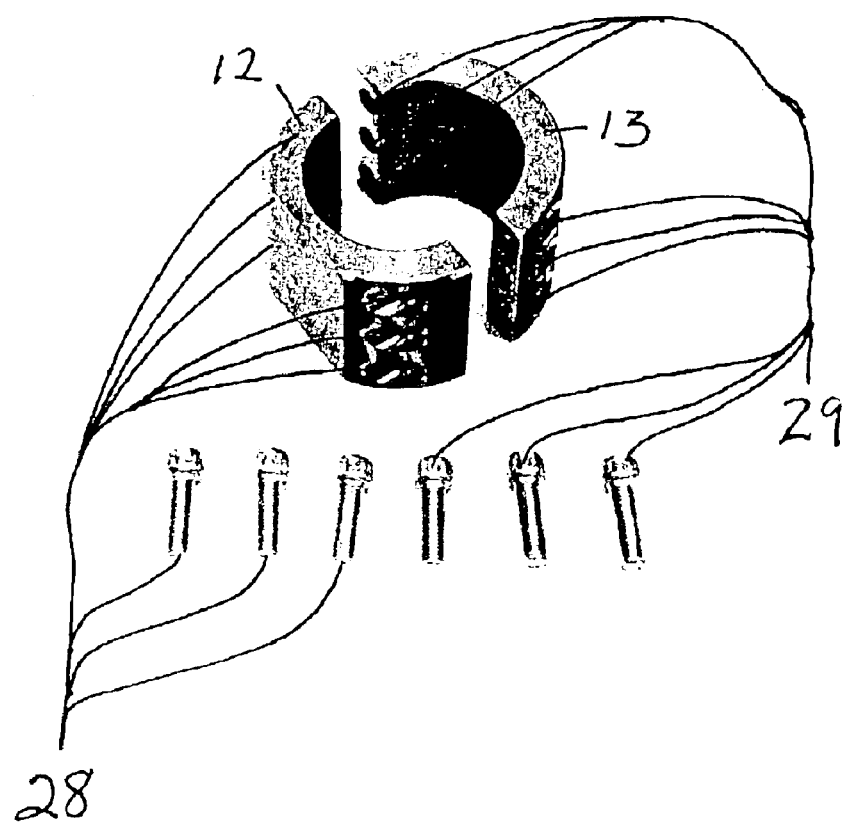
FIG. 2 is shows, from a different perspective, an unattached attachment apparatus without a structural member welded to it.
Figure 3:
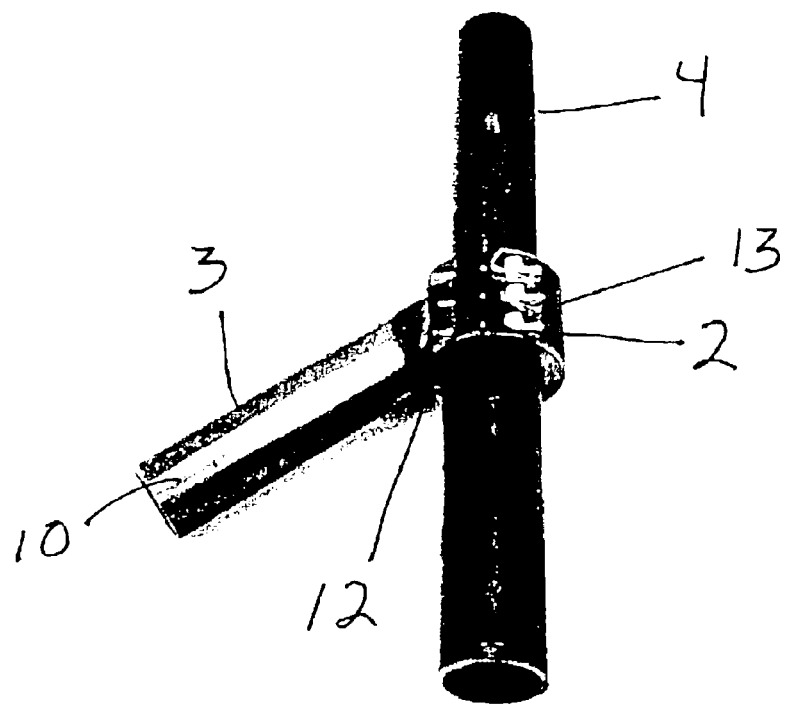
FIG. 3 shows an attached attachment apparatus in operation and the "receiving" (or second) and "attaching" (or first) structural members that it attaches.
Figure 4:
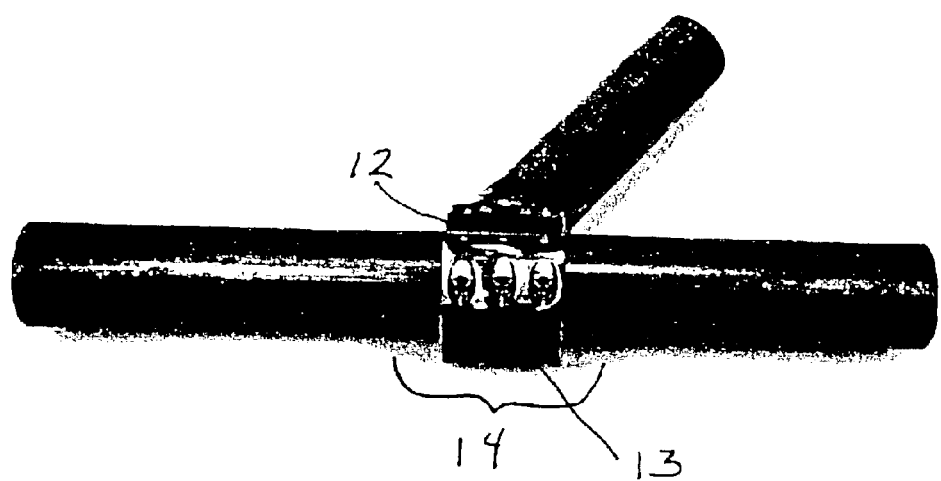
FIG. 4 shows, from a different perspective, an attached attachment apparatus in operation and the "receiving" (or second) and "attaching" (or first) structural members that it attaches.
Figure 5:
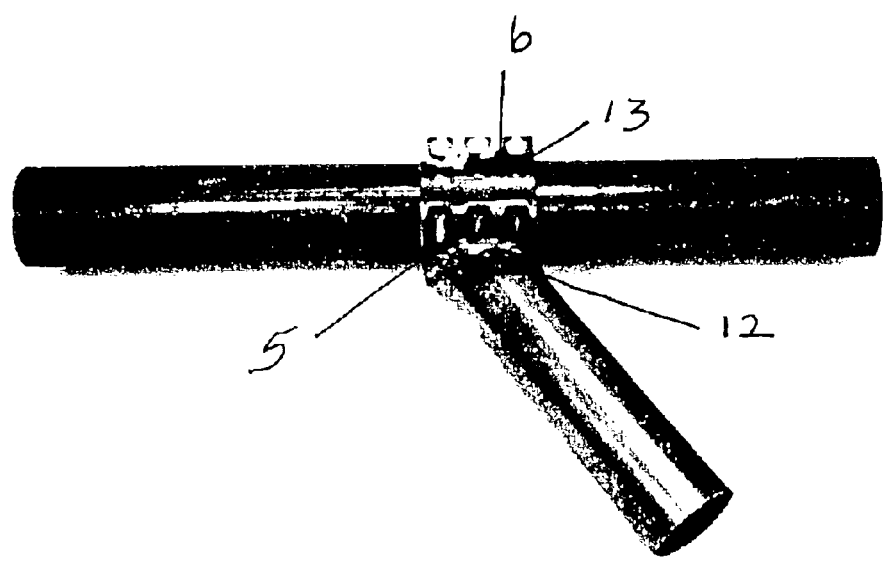
FIG. 5 shows a different perspective of an attached attachment apparatus in operation and the "receiving" and "attaching" structural members that it attaches.
Figure 6:
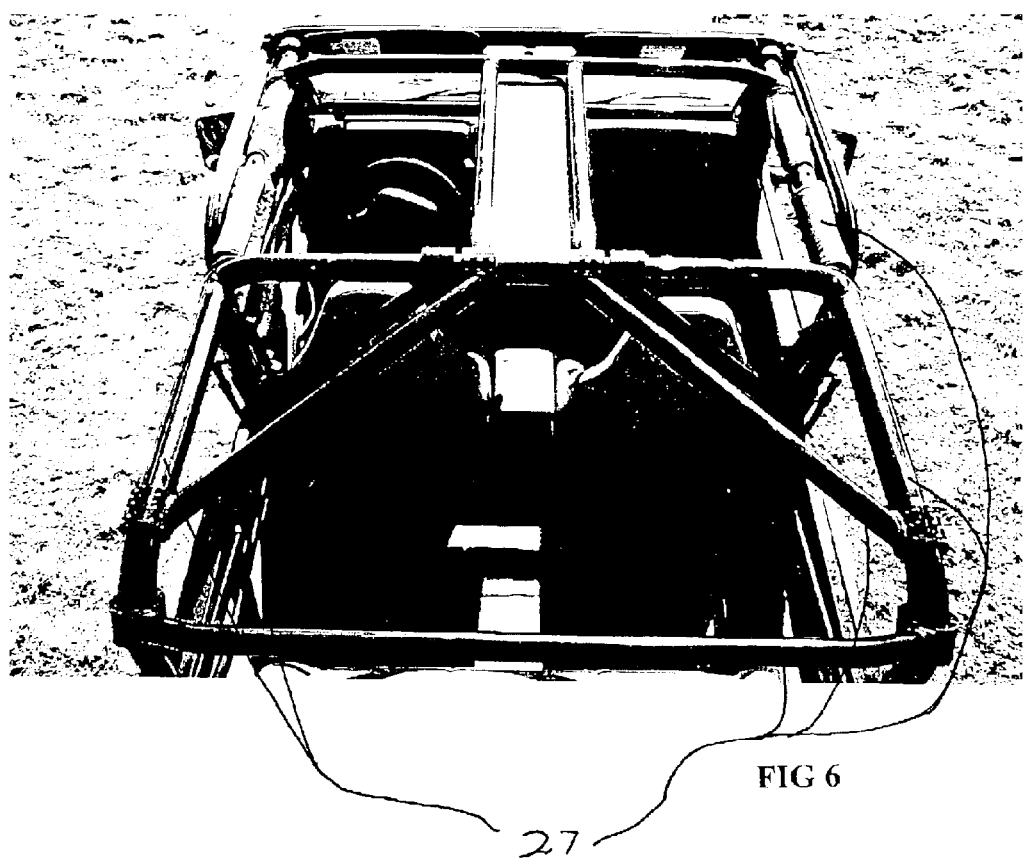
FIG. 6 shows a top view of an installed sport cage enhancement kit, complete with structural members (including the factory roll bar) and the attachment apparatus that connect them.
Figure 7:
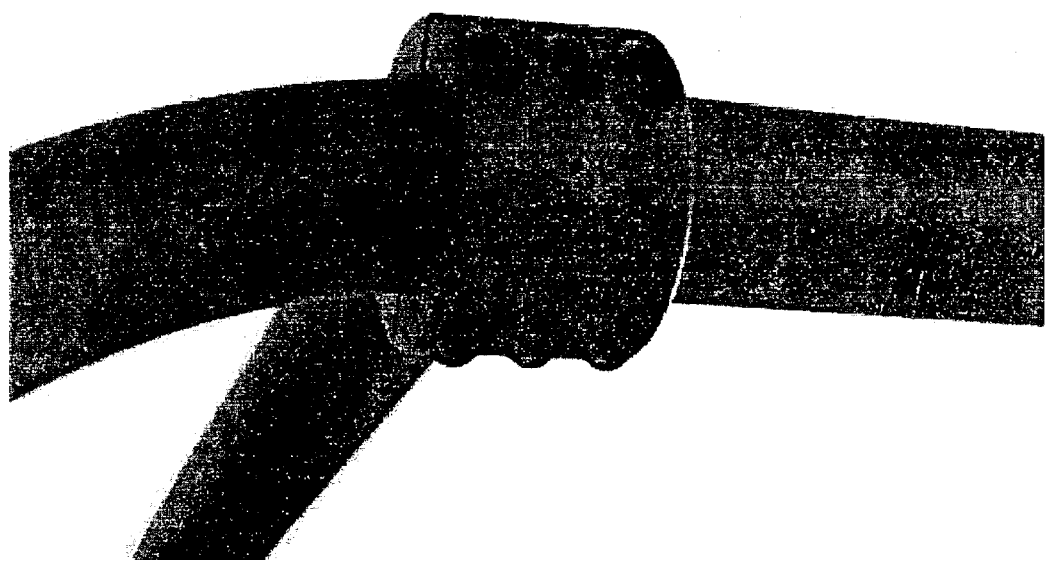
FIG. 7 shows an attachment apparatus attaching the terminal end of one "attaching" structural member to a "receiving" structural member.
Figure 8:
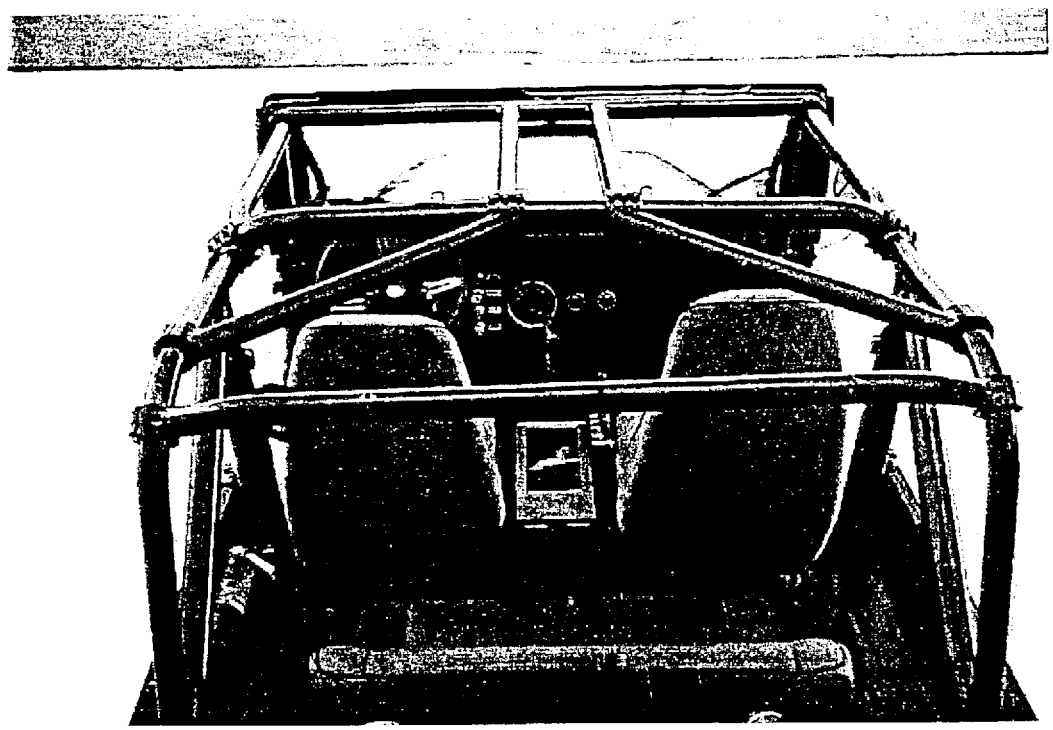
FIG. 8 shows a top rear view of a sport cage enhancement kit installed on a Jeep CJ7™ model, complete with structural members (including a rear bar and the factory roll bar) and the attachment apparatus that attach them.
Figure 9:
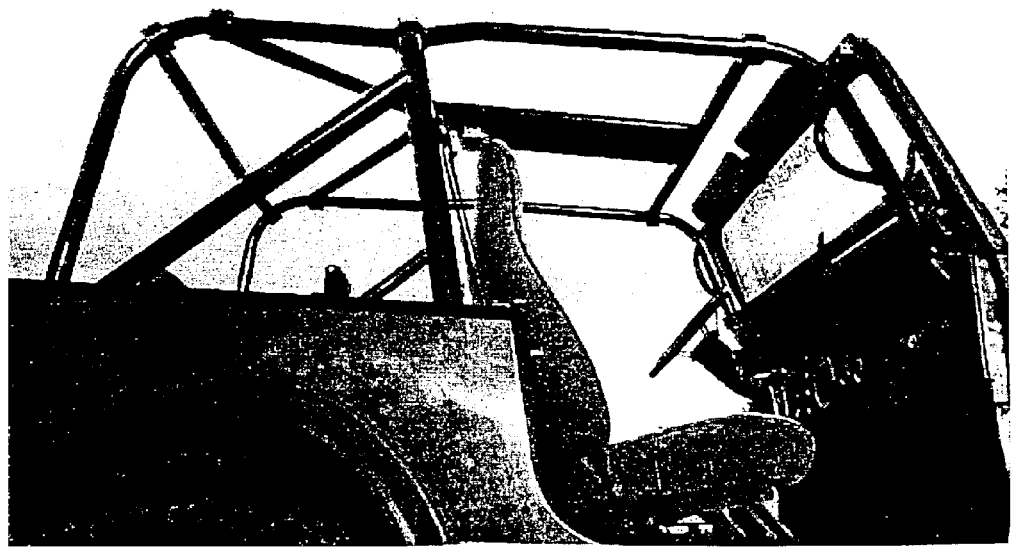
FIG. 9 shows a side view of a sport cage enhancement kit installed on a Jeep CJ7™ model, complete with structural members (including the factory roll bar) and the attachment apparatus that attachment them.

As mentioned earlier, the present invention includes a variety of aspects that may be combined in different ways. Each of these aspects is discussed separately. It is important to understand that the technology is for not only an off-road vehicle occupant protection roll cage (or equally, sport cage) system, but also for an off-road vehicle occupant protection roll cage enhancement system. The sport cage system (i.e., as opposed to the sport cage enhancement system) is a design for the entire roll cage, including the roll bar, whereas the sport cage enhancement system is a design that is added to a factory roll bar (i.e., a roll bar that exists on the off-road vehicle at the time of purchase (1)) or a pre-existing roll cage framework. Generic references to a roll cage or a sport cage or a safety cage or an off-road vehicle occupant protection roll cage framework are intended to apply equally to the sport cage system and the sport cage enhancement design. It is important also to understand that the invention regards roll cage (or, equally, sport cage) technology of varying degrees of breadth, from the individual sport cage structural support member connecting apparatus, articles of manufacture and methods to the entire sport cage system, inclusive of structural member connectors, structural members, and floor, dashboard and frame mounts.

In a basic form, the invention discloses off-road vehicle safety cage structural member attachment apparatus (e.g., 14) and methods. The invention discloses an attachment apparatus such as a clamping collar that may be used to secure two or more structural members together, without requiring welding, drilling or the use of chemical adhesive during installation, such that a strong connection between the structural members is achieved. In a preferred embodiment, the connector may be ½ inch thick CNC machined clamping collars, with six $\frac{5}{16}\times 1$ inch grade 8, socket head cap screws (7). An independent aspect of this invention is a very strong and secure connector that does not require welding for installation.

In another basic form, the invention discloses an attachment apparatus or clamping collar that comprise compressive retention elements (2) that may attach a terminal end of a first structural member (deemed the "attaching" structural member—or, the first off-road vehicle occupant protection roll cage framework structural member (10, 3)) to at least one other second structural member (deemed the "receiving" structural member, or the second off-road vehicle occupant protection roll cage framework structural member (11, 4) without requiring welding of one structural member to the other. The second off-road vehicle occupant protection roll cage framework structural member may be attached at an end or at a portion other than the end (an intermediate portion), but in the preferred embodiment, the attachment of the compressive retention elements (and thus the first off-road vehicle occupant protection roll cage framework structural member) is at an intermediate portion. Of course, where the attachment to the second off-road vehicle occupant protection roll cage framework structural member is at an end of the second off-road vehicle occupant protection roll cage framework structural member, another off-road vehicle occupant protection roll cage framework structural member may have the compressive retention elements established about or around it at an end. This embodiment may find application in many fields, including but not limited to off-road vehicle occupant protection roll cage framework installation kits (including complete and enhancement kits) and even factory sport cages. The point of attachment on the "receiving" structural support member and on the "attaching" structural support member may be located at any point along the length of the structural support member, while the point of attachment of the "attaching" member may be at an end of the member. Any structural member may be straight in section(s) and/or curved in section(s) or straight or curved along its entire length. In a preferred embodiment, the connector may be made from a strong rigid material such as steel or steel alloy or aluminum or titanium, for example, or any other metallic material or other rigid material that is capable of withstanding the stresses that may arise during a roll over and/or other type of vehicle accident. Additionally, the term attach and variant forms thereof is intended to include removable, releasable or detachable connections unless there is indication otherwise (i.e., permanent attachment).

In a preferred embodiment, the connector (i.e., the structural member connection apparatus that, as separate from any permanently attached structural member and any weld(s) or other attachment means that attach that structural member, is, upon installation, located in the direct vicinity of a section of the "receiving" or second off-road vehicle occupant protection roll cage framework structural member) may comprise two sections—a first compressive retention element (12) to which may be welded or bolted (or via another secure attachment means) the "attaching" or the first off-road vehicle occupant protection roll cage framework structural member (5), and a "receiving" or second compressive retention element to which no structural member is welded or bolted (at least in one embodiment there is no such structural member (6)). Each of the compressive retention elements may be of substantially half-circular cross sectional area (where the cross section is perpendicular to the longitudinal axis of the "receiving" member) having a thickness (Thus, the compressive retention elements may each have an inner and outer radius). Each inner radius may be defined by the first compressive element inner surface and the second compressive element inner surface, respectively. The inner radius of each compressive retention element may be approximately equal to the outer radius of the "receiving" or second structural member. The second compressive retention element may be said to be responsive to the first compressive retention element in an installed configuration, meaning that when the apparatus is installed (or even during its installation), a stimulus such as a force applied to the first compressive retention element (e.g., a force that causes the compressive retention elements to compress onto the second off-road vehicle occupant protection roll cage framework structural member) will cause some type of reaction of or response in the second compressive retention element (such as a compressive retention force). Additionally, as but one additional example, an impact force sustained by or transferred first to the first compressive retention element will cause some type of response in or reaction by the second compressive retention element in an installed configuration. In a preferred embodiment, the first and the second off-road vehicle occupant protection roll cage framework structural members have longitudinal axes that are not parallel and not collinear with one another. In at least one embodiment, either of the compressive retention elements has a substantially bisected cylinder shape, which refers to a shape created upon bisecting a cylinder at its longitudinal axis. Further, it is important to note that the preferred embodiment of the invention does not comprise a universal ball joint (or any type of other ball joint) in any manner. At least one embodiment of the invention does not comprise rivets in any manner. At least one embodiment of the invention does not comprise any penetrating of the second off-road vehicle occupant protection roll cage framework structural member. Further, in at least one embodiment, compression is caused by a force that arises from the movement of compressive retention elements in a direction towards the central axis of the second off-road vehicle occupant protection roll cage framework structural member, and the obstruction to this movement provided by a second off-road vehicle occupant protection roll cage framework structural member outer surface.

At least one embodiment of the invention comprises at least two first compression generation elements (28) to which the first compressive retention element is compressively responsive and at least two second compression generation elements (29) to which the second compressive retention element is compressively responsive. By compressively responsive is meant that activation of the compression generation elements (as by turning bolts, and possibly also rotating about a hinge) causes the compressive retention elements to compress onto the second off-road vehicle occupant protection roll cage framework structural member. The at least two second compression generation elements, together with the at least two first compression generation elements, enable engagement (e.g. compressive engagement) of the second compressive retention element with the first compressive retention element, and enable disengagement of the second compressive retention element from the first compressive retention element. At least a portion of the first compressive retention element inner surface (15) may be configured to apply a compressive retention force to at least a first portion of the second off-road vehicle occupant protection roll cage framework structural member during activation of the first and second compressive generation elements. Similarly, at least a portion of the second compressive retention element inner surface may be configured to apply a compressive retention force to at least a second portion of the second off-road vehicle occupant protection roll cage framework structural member during activation of the first and second compressive generation elements. Of course, this application may be through direct or indirect contact (indirect contact referring to a design that intends the placement of an intermediate surface such as a thin, flexible matting (as but one example) between the compressive retention elements and the second off-road vehicle occupant protection roll cage framework structural member). "Configured to apply a compressive retention force" means shaped, sized, and/or designed so as to be able to apply a compressive retention force (e.g., a force that acts to compress the compressive retention elements onto the second off-road vehicle occupant protection roll cage framework structural member) upon activation of at least some of the compressive retention elements. In a preferred embodiment, the at least a first portion and the at least a second portion of the second off-road vehicle occupant protection roll cage framework structural member are located on opposite sides of the second off-road vehicle occupant protection roll cage framework structural member. Indeed, they may be located diametrically opposite one another.

Compressive generation elements are any elements that are usable to generate compression of the compressive retention elements onto the second off-road vehicle occupant protection roll cage framework structural member. They include, but are not limited to, bolts, nuts, bolt holes such as threaded bolt holes and pass-through bolt holes, and hinges, or hinge part that are engageable with one another. In a preferred embodiment, the compression generation elements include bolt pass through holes and threaded bolt pass through holes that are located so as to be aligned with the bolt pass through holes in an installed configuration. In at least one embodiment, the compression generation elements may comprise bolt pass-through holes, at least one bolt, and at least one nut engageable with that bolt(s). In at least one embodiment, the compression generation elements may include at least one permanently fixed bolt, a bolt pass-through hole, and a nut engageable with that bolt. In at least one embodiment, any of the at least two compression generation elements may comprise at least two threaded holes which are able to threadedly engage a bolt and/or bolt pass-through holes that are configured to allow a bolt to pass through them but obstruct the head of the bolt. The term hole or hole element (when not qualified as a through hole or through hole element) in intended to encompass not only through holes (i.e., holes that pass thorough a material, thus having two open ends) but also holes that do not pass entirely through a material and thus have only one open end (such as a recess). Threaded holes may thus be qualified as threaded through holes. The compression generation elements may enable adjustment of the first off-road vehicle occupant protection roll cage framework structural member with respect to the off-road vehicle occupant protection roll cage framework.

The first compressive retention element may comprise a compressive retention member outer surface that has an off-road vehicle occupant protection roll cage framework structural member interface. This interface may be any surface (it may be flat or it may be cylindrical, or bi, tri, or quadplanar as but a few examples) to which a first off-road vehicle occupant protection roll cage framework structural member may be attached somehow (such as permanently, whether by welding or some other manner such as molding, extrusion or non-reversible bolting, as but a few examples). The interface may also be an internal surface to which is permanently attached a first off-road vehicle occupant protection roll cage framework structural member. The term inner surface refers to the surface of the compressive retention element that is disposed towards the second off-road vehicle occupant protection roll cage framework structural member in an installed configuration. The term outer surface refers to the surface of the compressive retention element that is disposed away the second off-road vehicle occupant protection roll cage framework structural member in an installed configuration. A remaining surface of a compressive retention element may be termed a radial surface. "Radial surface" refers to a surface of a compressive retention element, said surface being neither the surface deemed "outer" nor the surface deemed "inner", but instead, a surface that is situated intermediately of the inner and the outer surfaces and that has at least one portion that is substantially parallel to a line that is an extension of a radius of the second off-road vehicle occupant protection roll cage framework structural member. The inner surface may also be substantially flat and planar such that it is, at least conceptually, part of a plane that contains the longitudinal axis of the second off-road vehicle occupant protection roll cage framework structural member on which the compressive retention elements are compressed in an installed configuration.

In at least one embodiment, the first compressive retention element inner surface (the inner surface of the first compressive retention element) may be adapted to apply a compressive force to at least a portion of the outer surface of a first bisecting half (17) of the second off-road vehicle occupant protection roll cage framework structural member.

Such adaptation may include sizing (as by design and/or manufacturing) the inner surface of the first compressive retention element so that at least a portion of it can apply a compressive force (through direct contact or otherwise) to at least a portion of the outer surface of a first bisecting half of the second off-road vehicle occupant protection roll cage framework structural member. The term bisecting half refers to a conceptual half of the second off-road vehicle occupant protection roll cage framework structural member in the vicinity of the first compressive retention element (in an installed configuration) and is formed upon conceptually splitting or bisecting the second off-road vehicle occupant protection roll cage framework structural member about which the compressive retention elements are established in an installed configuration, and along the longitudinal axis of this portion of the second off-road vehicle occupant protection roll cage framework structural member. Thus, this "half" (either the first or the second bisecting half) may not be (and in a preferred embodiment, indeed it is not) a true one-half of the entire second off-road vehicle occupant protection roll cage framework structural member. Of course, a curved off-road vehicle occupant protection roll cage framework structural member has a longitudinal axis also, and thus can be conceptually bisected. In a preferred embodiment, the adaptation of the first compressive retention element inner surface to apply the aforementioned compressive force includes sizing substantially all of the first compressive element inner surface so that it approximates substantially all of (as opposed to merely a portion of) the outer surface of a bisecting half of the second off-road vehicle occupant protection roll cage framework structural member. Designs where the first compressive retention element inner surface is adapted to apply a compressive force to less than 40% of the length of the cross-section of the outer surface of the second off-road vehicle occupant protection roll cage framework structural member (whether that portion be less than approximately 40%, 30%, 20%, 10%, 5% or even as small as approximately equal to 1%, e.g.) are also part of the inventive subject matter.

In at least one embodiment, the first compressive retention element may be substantially similar in shape and size to the second compressive retention element, which may be configured to oppositely face the first compressive retention element in an installed configuration. Of course, these two components may be said to oppositely face one another even when there is an off-road vehicle occupant protection roll cage framework structural member in between them (in an installed configuration). The second compressive retention element inner surface (i.e., the inner surface of the second compressive retention element) also may be adapted to apply a compressive force to at least a portion of the outer surface of a second bisecting half of the second off-road vehicle occupant protection roll cage framework structural member. Such adaptation may include sizing (as by design and/or manufacturing) the inner surface of the second compressive retention element so that at least a portion of it can apply a compressive force (through direct contact or otherwise) to at least a portion of the outer surface of a second bisecting half of the second off-road vehicle occupant protection roll cage framework structural member. Analogously to the first compressive retention element, the second compressive retention element inner surface may be adapted to apply a compressive force to only a portion of the outer surface of the second bisecting half of the off-road vehicle occupant protection roll cage framework structural member, but in a preferred embodiment, the second compressive retention element inner surface is adapted to apply a compressive force to substantially all of the outer surface of the second bisecting half of the off-road vehicle occupant protection roll cage framework structural member. Further, in at least one embodiment, the "at least a portion" of the outer surface of the first bisecting half of the second off-road vehicle occupant protection roll cage framework structural member to which the compressive force may be applied by the inner surface of the first compressive retention element is located on an opposite off-road vehicle occupant protection roll cage framework structural member sides. Indeed, these surfaces may be diametrically opposite one another. In at least one embodiment, the length of a cross-section of the at least a portion of the second compressive retention element inner surface is greater than 40% of the length of the cross section of the outer surface of the second off-road vehicle occupant protection roll cage framework structural member, wherein the term length includes arc length or may be an individual straight segment, or a sum thereof, as but a few examples. Similarly, in at least one embodiment, the length of a cross-section of the at least a portion of the second compressive retention element inner surface is greater than 40% of the length of the cross section of the outer surface of the second off-road vehicle occupant protection roll cage framework structural member. Designs where the second compressive retention element inner surface is adopted to apply a compressive force to less than 40% of the length of the cross-section of the outer surface of the second off-road vehicle occupant protection roll cage framework structural member (whether that portion be less than approximately 40%, 30%, 20%, 10%, 5%, or approximately equal to 1%, e.g.) are also part of the inventive subject matter.

Each structural member attachment apparatus (14) may comprise at least two holes (e.g. bolt holes) located on opposite sides of the compressive retention element. The holes may each have a longitudinal axis substantially parallel to a line tangent to the outer surface of the second off-road vehicle occupant protection roll cage framework structural member. The bolt holes may be threaded or non-threaded, but the bolt holes must in some manner be adapted for reception of a bolt (either by being adapted for threaded engagement of a bolt or by being adapted to allow the stem portion of a bolt to pass through but obstructing the bolt head). In this manner, all bolt holes may be said to enable engagement of the second compressive retention element with the first compressive retention element, and similarly enable disengagement of the second compressive retention element from the first compressive retention element. The longitudinal axis of each of the bolt holes of the first compressive retention element may be co-linear with the longitudinal axis of a different one of the bolt holes of the second compressive retention element when the first compressive retention element is engaged with the second compressive retention element about or around or externally of at least a majority portion of the outer surface of the second off-road vehicle occupant protection roll cage framework structural member. Each bolt hole may penetrate a radial surface of the compressive retention element of which the bolt hole is a part. Further, the first compressive retention element may comprise a first compressive outer surface that has an off-road vehicle occupant protection roll cage framework structural member interface.

In at least one embodiment, each compressive retention element may have provided in a substantially tangential direction through the compressive retention element at least one hole such that a bolt(s) may pass through an area of each compressive retention element (5). This area may be defined by a plane that is aligned with the axis of the "receiving" structural member and that, at least conceptually, bisects the connector to form two halves. When used to characterize the connector or structural member attachment apparatus, the term half indicates substantially a half, and a compressive retention element may be a half even where a structural member is permanently attached to it. The hole(s) are provided on either side of each compressive retention element and, upon proper manual aligning of the connector halves about or around or about a "receiving" structural member, each of the hole(s) of one of the compressive retention elements matches up with each of the hole(s) of the other compressive retention element (3). Note that proper aligning during installation also entails proper spatial positioning of the "attaching" structural member(s). This proper alignment or positional pairing of the connector allows bolts to pass through each of the holes of one compressive retention element into each of the holes of the other compressive retention elements when the two compressive retention elements are oppositely established about the receiving tube. Threads may be provided in the holes of each compressive retention element, or they may only be provided in the holes of only one of the compressive retention elements (the compressive retention element corresponding with the leading part of the bolt). Bolts or screws of any type (socket head cap screws (7) and the like) may be provided and used to secure the compressive retention elements together and compressibly about or around the "receiving" structural member. Methods corollary to this apparatus are also included as independent aspects of the invention.

In a preferred embodiment, the connector or attachment apparatus may be ½ inch thick CNC machined clamping collars, with six 5/16×1 inch grade 8 socket head cap screws (see FIGS. 1–5). Proper installation may entail tightening bolts only incrementally and alternatingly so that compression is evenly distributed about or around the "receiving" structural member. This compression, if adequately provided by sufficient turning of the bolts, will cause a frictional attachment or connection of the "attaching" compressive retention element (and, importantly, of the "attaching" structural member that is securely attached to this compressive retention element) and the "receiving" compressive retention element to the "receiving" structural member.

At least one embodiment of this invention is an attachment apparatus and associated method for securely attaching two or more support or structural members to each other, wherein the method does not require the step of slipping the attachment apparatus over the end of the "receiving" structural member and sliding it to the desired attachment location on the "receiving" structural member. Indeed, the entire attachment method may, in at least one embodiment of the invention, take place in the immediate vicinity of the attachment site of the receiving or second structural member.

An independent aspect of this invention is a very strong and secure connector that does not require welding for installation. Any attachment or connection abutment or conjoining, whether it be achieved by a part's own integral material, by compressional friction, bolts, welds, adhesive, or any other means, may be referred to as a connection or coupling; two or more elements connected in such manner may be said to be connected or coupled. The connector, while as described herein as part of a sport or roll cage system (or enhancement system) may also find application in other fields where it is desired to attach the terminal end of one or more structural members (or elements) to another structural member. Methods corollary to this apparatus are also included as independent aspects of the invention.

In another embodiment, the connector may act to connect three or more structural members. In such case, either the "attaching" part of the connector or more generally a first compressive retention element would have welded to it two or more attaching structural members, and the "receiving" part of the connector, or more generally, a second compressive retention element would have no structural members attached to it, or the there would be two "attaching" parts of the connector and no "receiving" part because each part of the connector would have attached to it at least one structural member. However, there will still be a "receiving" structural member. Note that structural members is intended as a broad term and may include either structural members that are either pre-existing on the off-road vehicle during purchase or not (such as those that are purchased for installation in a sport cage kit). Methods corollary to this apparatus are also included as independent aspects of the invention.

In any of the embodiments mentioned herein, the dimensions of the inner surface of the compressive retention elements (i.e., the surface that is closest to the outer surface of the structural member) will be equal or approximately equal to the dimensions of the outer surface of the "receiving" structural member about or around which the connector is installed. The structural member may be tubular (see FIG. 3), and may have a circular, ringed cross section and an inner and outer diameter, or the structural member may be any of a variety of other shapes, such as square, rectangular, oval, hexagonal or octagonal, and the like, each with inner and outer dimensions.

Figure 10:
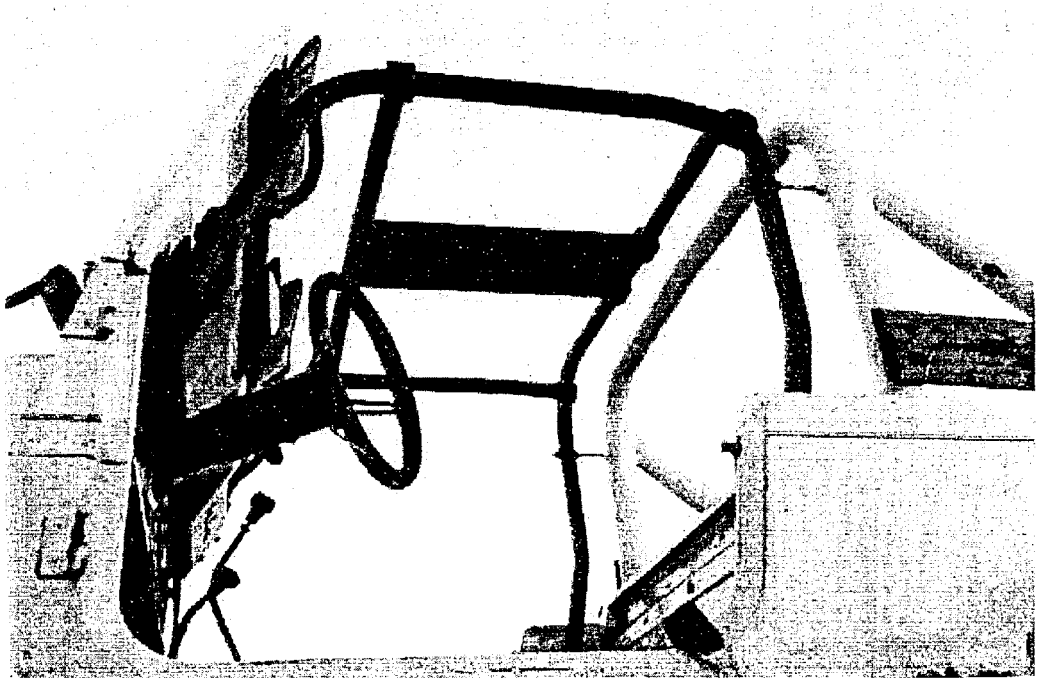
FIG. 10 shows a side view of a sport cage enhancement kit, installed on a Jeep Scrambler™, complete with structural members (including the factory roll bar) and the attachment apparatus that attach them.
Figure 11:
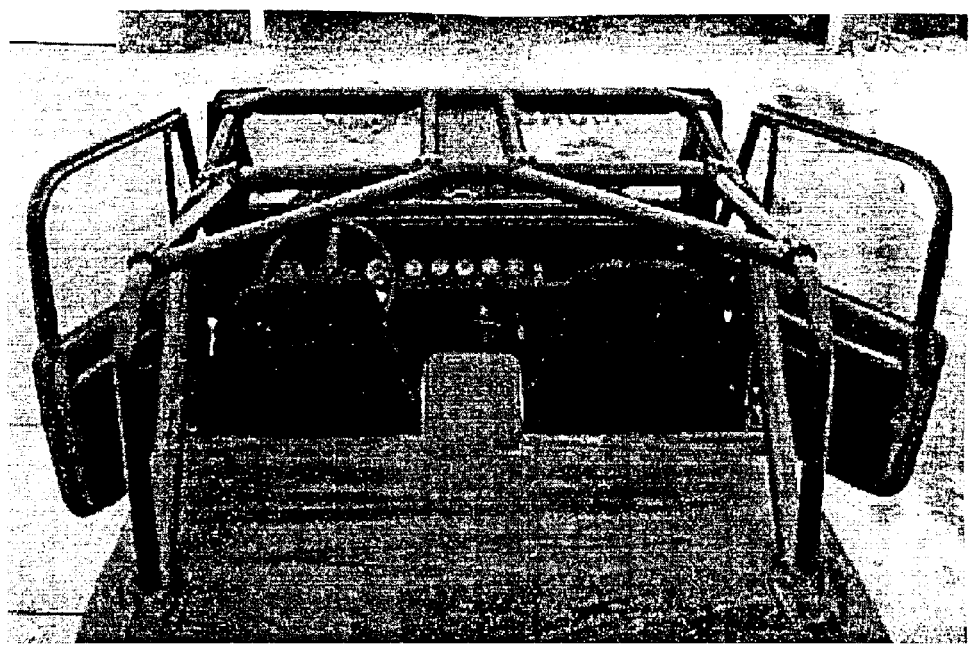
FIG. 11 shows a rear view of a sport cage enhancement kit installed on a 1988 Jeep Wrangler™ model, complete with structural members (not including rear bar but including the factory roll bar) and the attachment apparatus that attach them.
Figure 13:
FIG. 13 shows a side view of the rear section of a sport cage enhancement kit installed on a Jeep Wrangler™ model, complete with structural members (including the factory roll bar) and the attachment apparatus that attach them.
Figure 14:
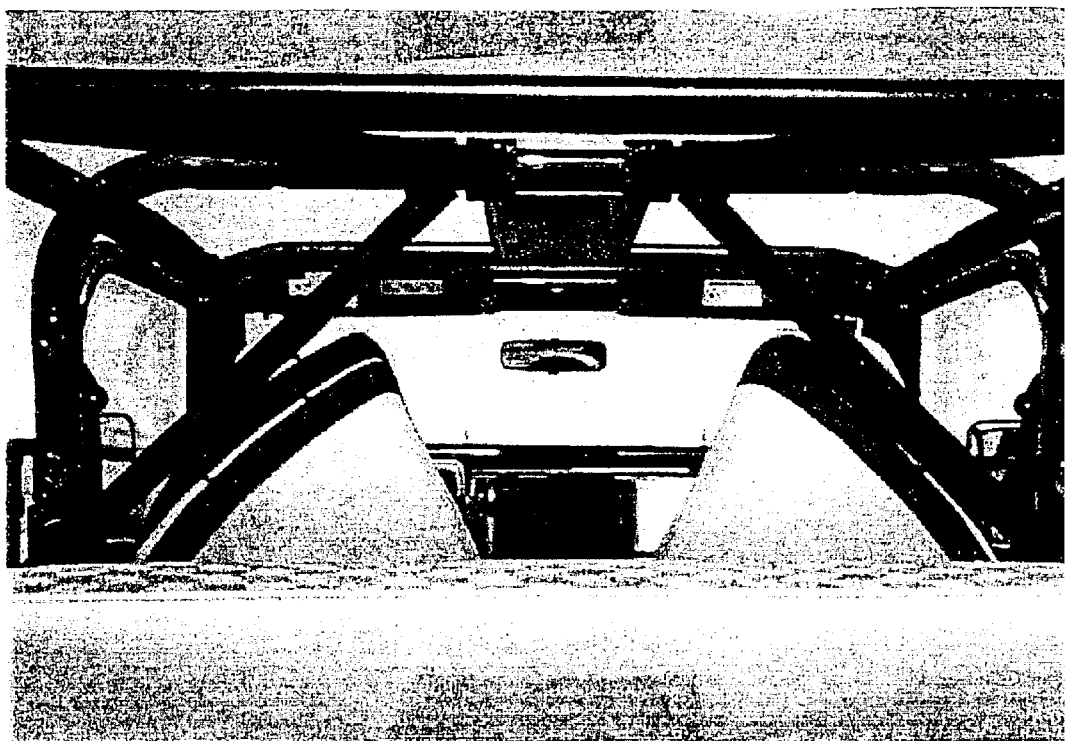
FIG. 14 shows a rear view an installed sport cage enhancement kit, compete with structural members (including the factory roll bar) and the attachment apparatus that attach them, and showing the angle bars that may be used for attachment of a 5-point harness.
Figure 15:
FIG. 15 shows a side handles used to facilitate entry into and exit from an off-road vehicle.
Figure 16:
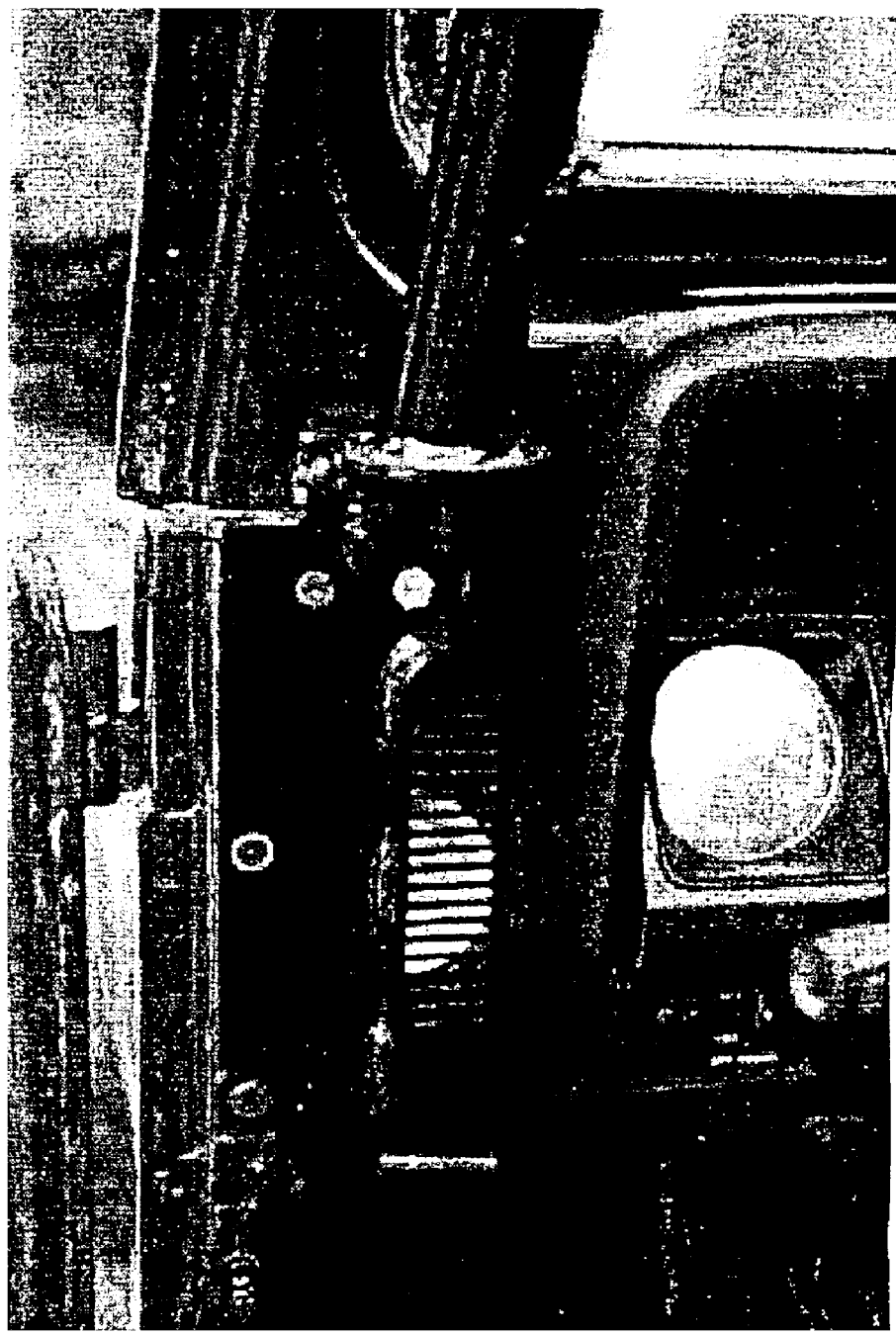
FIG. 16 shows an installed dashboard mount.

Another embodiment of the invention incorporates not only the individual connectors used in the system, but also the structural members that are attached to the connectors and that, when installed with the connectors, make a complete sport or roll cage (see FIGS. 6, 8–15, and 28–31). Frame mount(s) (see FIGS. 24–27), and/or floor mount(s) (see FIGS. 18–23) may also be a part of this apparatus, constituting a separate embodiment. Either embodiment may be an off-road vehicle occupant protection roll cage enhancement or upgrade kit, usable to provide more protection to occupants of off-road vehicles than the protection offered by a pre-existing roll bar (1) or roll cage, such as one pre-installed on a new vehicle by the manufacturer (a factory bar or cage) or a bar or cage installed at some point after initial purchase. In a preferred embodiment, the structural members may be elongated and tubular in shape (i.e., have a circular cross section with an inner and outer diameter), but any other cross-sectional shape (such as hexagonal) may also prove adequate. In a preferred embodiment, the structural members are made from 1¾ inch outer diameter 120 wall (1¾×0.120 wall) steel tubing. Another embodiment of the invention may be a complete off-road vehicle occupant protection roll cage kit (instead of merely an enhancement kit), usable when there is no pre-existing roll cage structure. Frame mount(s), and floor mount(s) may also be a part of this embodiment. Another embodiment may be a reinforcement kit, whereby an existing roll bar or roll cage kit may be strengthened with at least one structural member and at least one connector. As but two examples are a rear bar (see FIG. 13) kit and an angle bar (see FIG. 11) kit or 5 point harness bar kit (see FIG. 14). In each of these embodiments, the connectors (or more generally connector elements) and the structural members (or more generally structural elements) are as described above. A five-point harness attachment bar(s) using the invention's connector(s) may be incorporated into the design, perhaps including accommodation on the structural members for the attachment of the harness(es). Any of the embodiments may include a metal plate (see FIG. 10), established between two center bars, generally located substantially above the space between the driver and front passenger. The plate may be, as but one example, 14 gauge. Any embodiment may also include a rear bar(s) and/or side bar(s) and/or angle bar(s) and/or center bar(s). A sport cage or an enhancement kit, including a connector, structural member(s) and any other parts, may be readily shipped disassembled to a purchaser using standard carrier shipping. Methods corollary to this apparatus are also included as independent aspects of the invention.

Figure 12:
FIG. 12 shows a lower side view of a sport or safety cage enhancement kit installed on a Jeep Wrangler™ model, complete with structural members (including the factory roll bar) and the attachment apparatus that attach them.

Another embodiment of the invention incorporates the connectors and the structural members of a complete or enhancement kit but with the structural members connected to one another in a certain fashion, depending on which vehicle the complete or enhancement kit is to be added to. For example, FIG. 12 shows how the structural members of the enhancement kit may be added to any pre-existing roll bar on the Jeep Wrangler™ 1997–2001 TJ model vehicle such that an enhanced high degree of protection in the event of a rollover is provided. Other related embodiments may or may not include one or more of the following: floor mounts, dashboard and frame mounts. The cage, as assembled, will not interfere with operation of a folding windshield or the use of window cranks on hard doors. The design may also fit either hard or soft top off-road vehicles. Side handles may be incorporated to facilitate driver and passenger entry into and exit from the vehicle. Methods corollary to this apparatus are also included as independent aspects of the invention.

Another embodiment of the invention is a business method related to off-road vehicle roll cage occupant protection systems. This embodiment is new because it presents a business method by which an off-road vehicle roll cage occupant protection system can be enhanced or constructed in its entirety after shipment to a consumer (or pickup by a consumer) and after installation by a person with only readily available tools and only a basic skill in using these tools. Other existing systems require welding by the installer; the present invention does not require welding by the installer and installation is therefore much simpler and achievable by anyone in their own garage and with a basic set of tools, a basic understanding of their use, and an ability to follow a simple set of instructions. Provision of the enhancement kit or the complete kit to an interested consumer may be made via third party shipping such as United Parcel Service or the United States Post Office or the like or may be available for pickup by a consumer at a store or other centralized location. Upon provision of the kit (including instructions) to the consumer or an associate of the consumer, the consumer may then install the kit onto an off-road vehicle using only a basic set of tools and with only a basic skill in using them. Only tools such as an allen wrench, or another type of wrench for example, may be required. No welding, as is required with other available sport cage systems, is necessary for installing the sport cage disclosed herein. Methods corollary to this apparatus are also included as independent aspects of the invention.

Figure 17:
FIG. 17 shows an installed dashboard mount.
Figure 18:
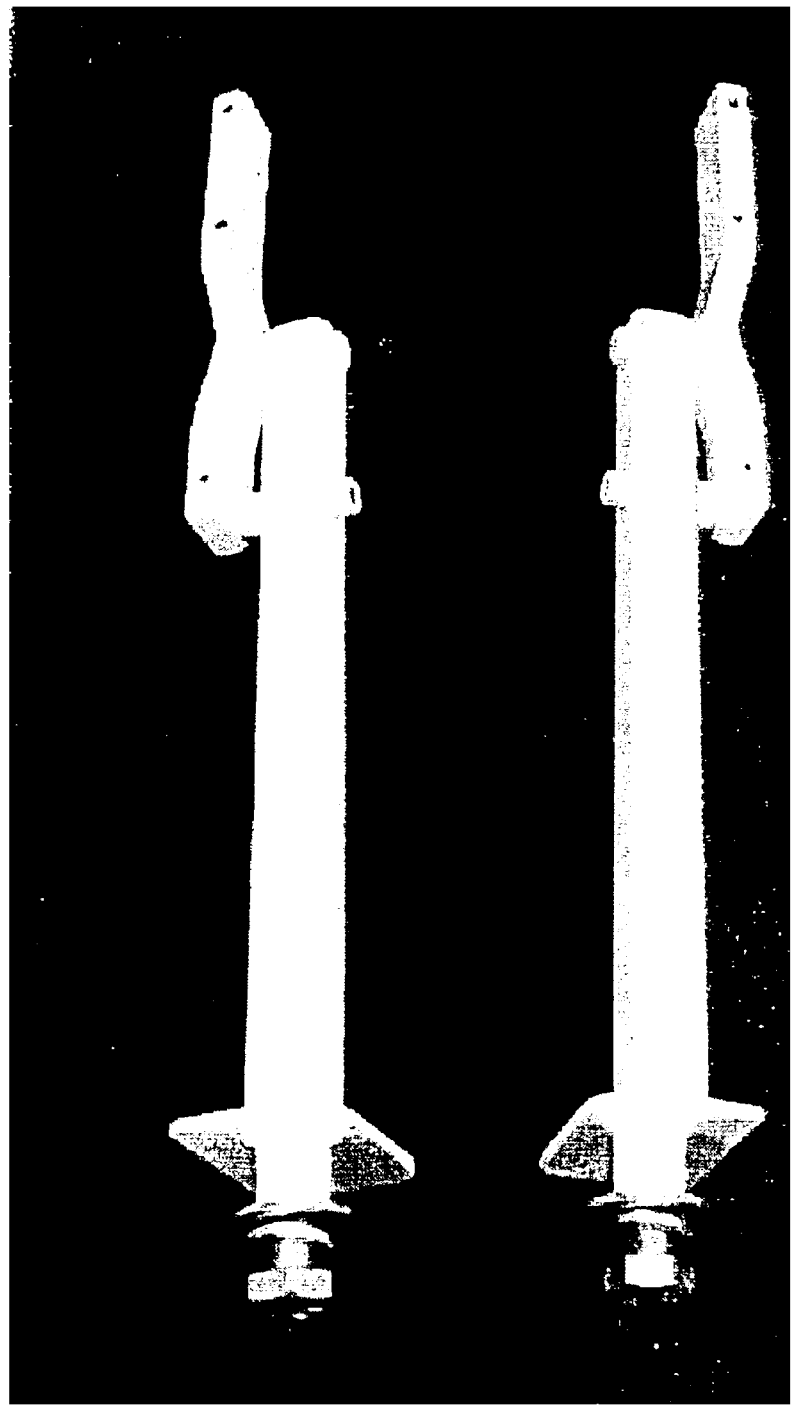
FIG. 18 shows a floor mount for a Jeep Wrangler™ 1997–2001.
Figure 19:
FIG. 19 shows an installed floor mount for a Jeep Wrangler™ 1997–2001.
Figure 20:
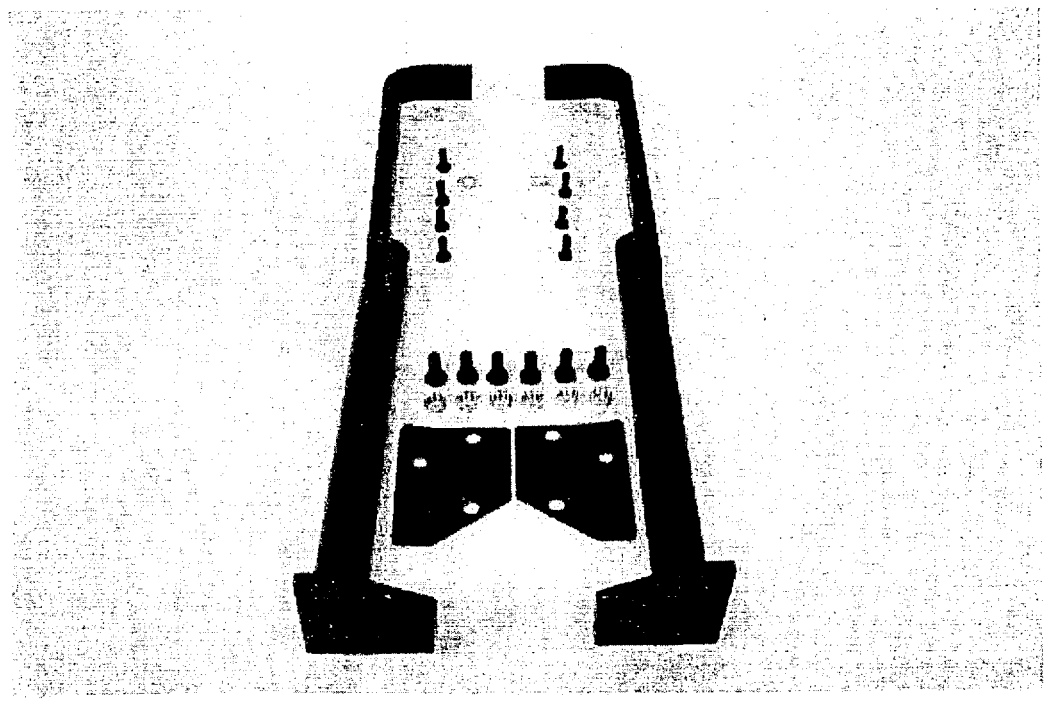
FIG. 20 shows an unassembled floor mount for a Jeep Wrangler™.
Figure 21:
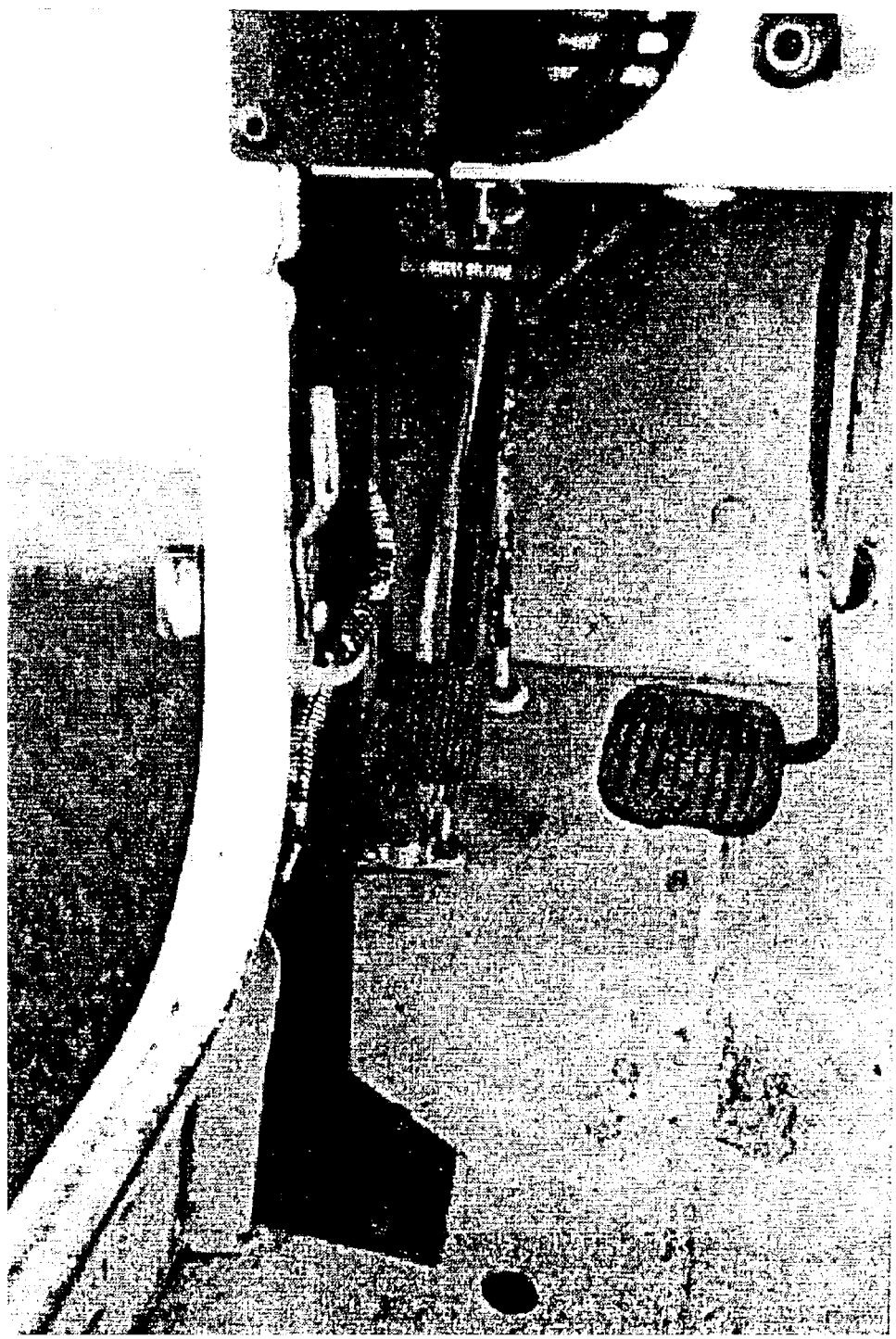
FIG. 21 shows an installed floor mount for a Jeep Wrangler™.
Figure 22:
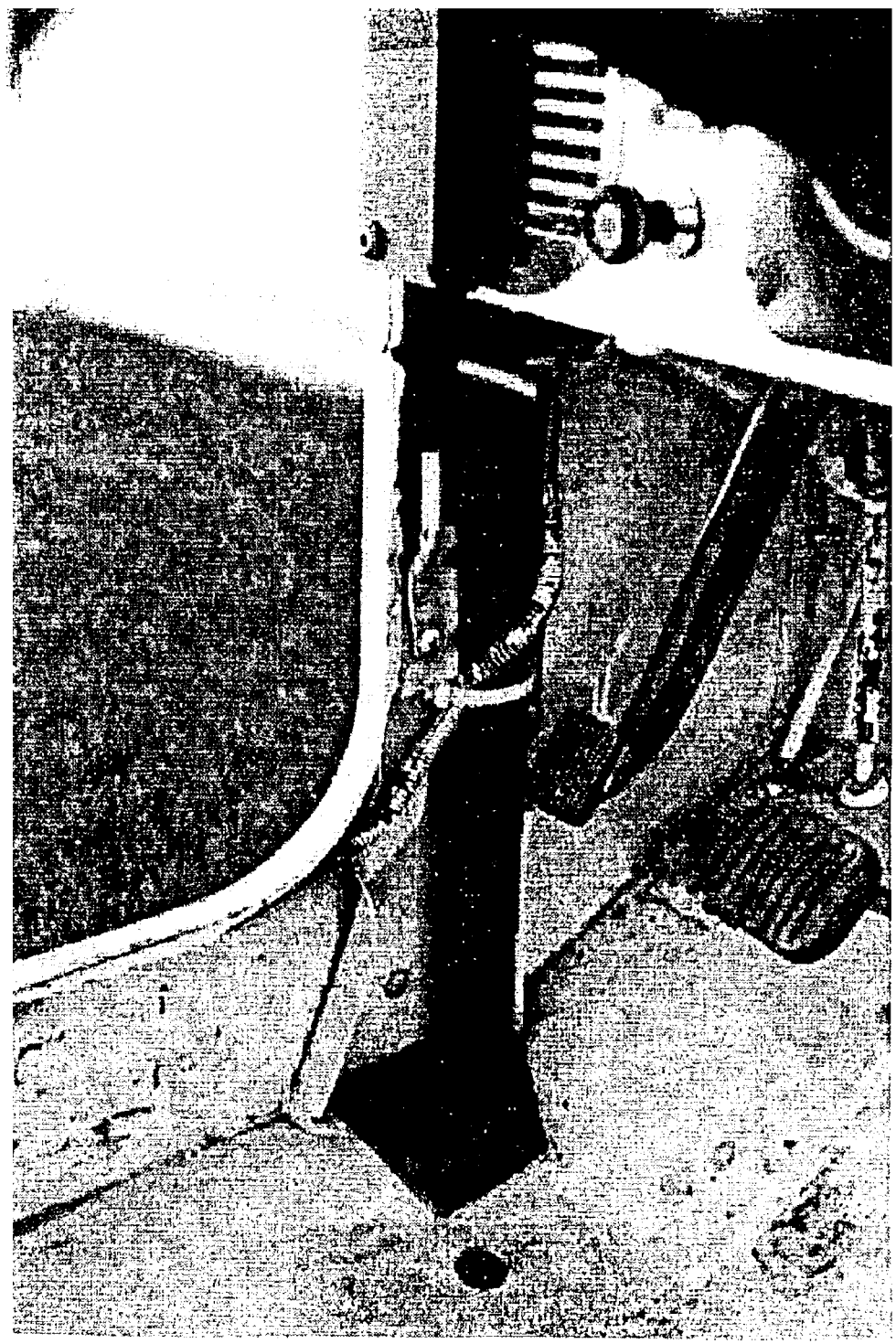
FIG. 22 shows a different perspective of an installed floor mount for a Jeep Wrangler™.
Figure 23:
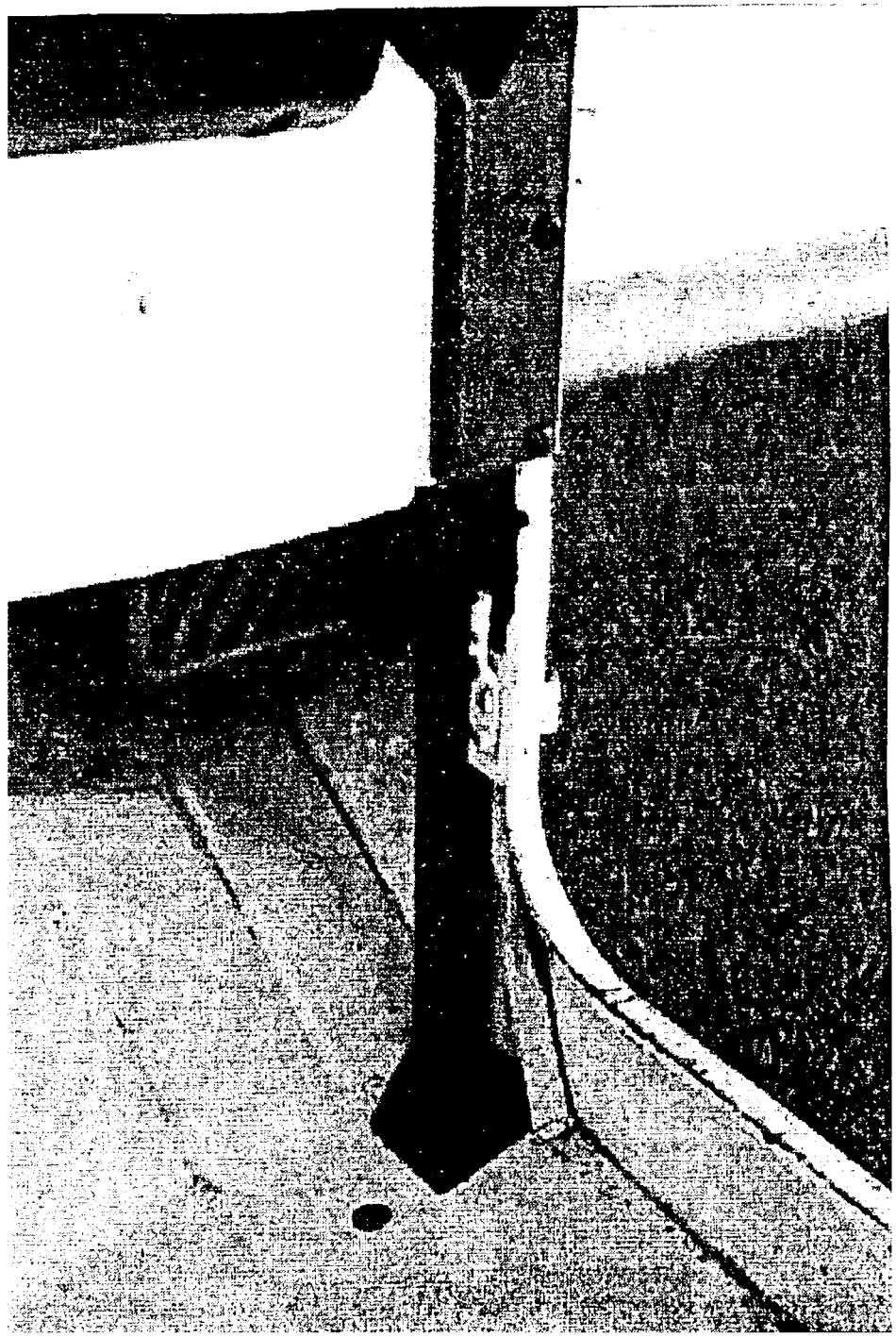
FIG. 23 shows an installed floor mount from a different perspective for a Jeep Wrangler™.
Figure 24:
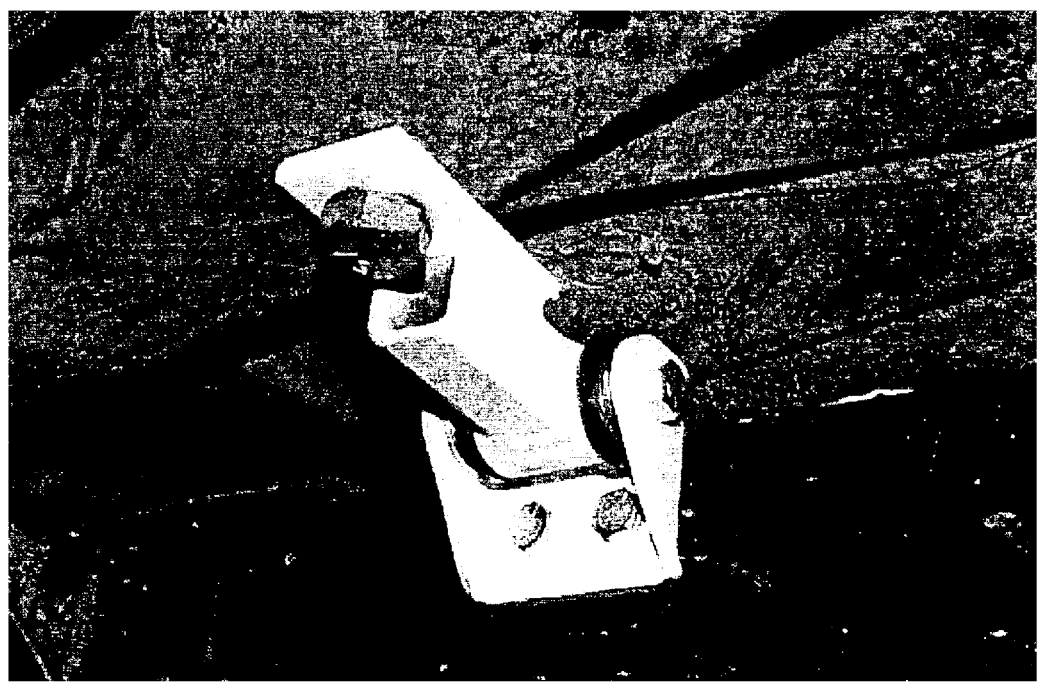
FIG. 24 shows a frame mount installed on a Jeep Wrangler™.
Figure 25:
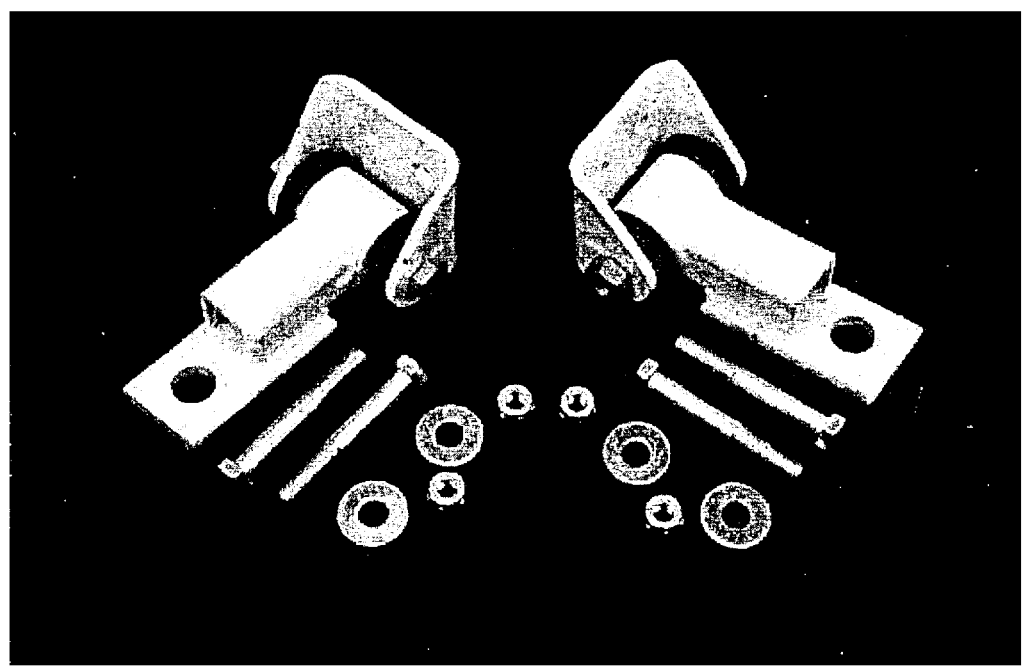
FIG. 25 shows an unassembled frame mount installed on a Jeep Wrangler™.
Figure 26:
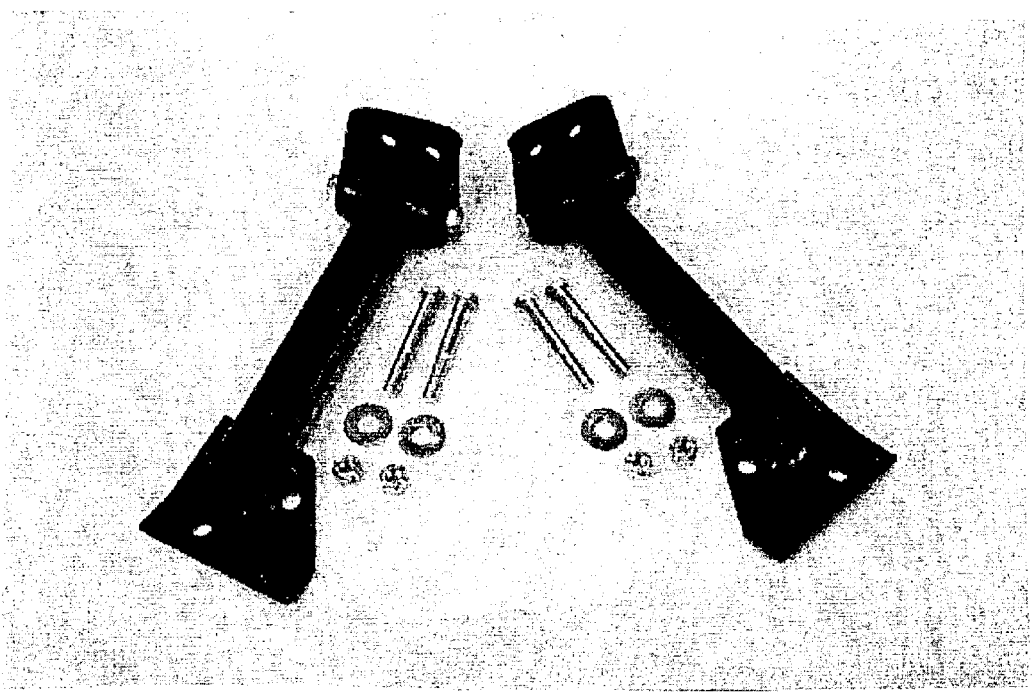
FIG. 26 shows an unassembled frame mount for a Jeep Wrangler™, CJ™ and Scrambler™.
Figure 27:
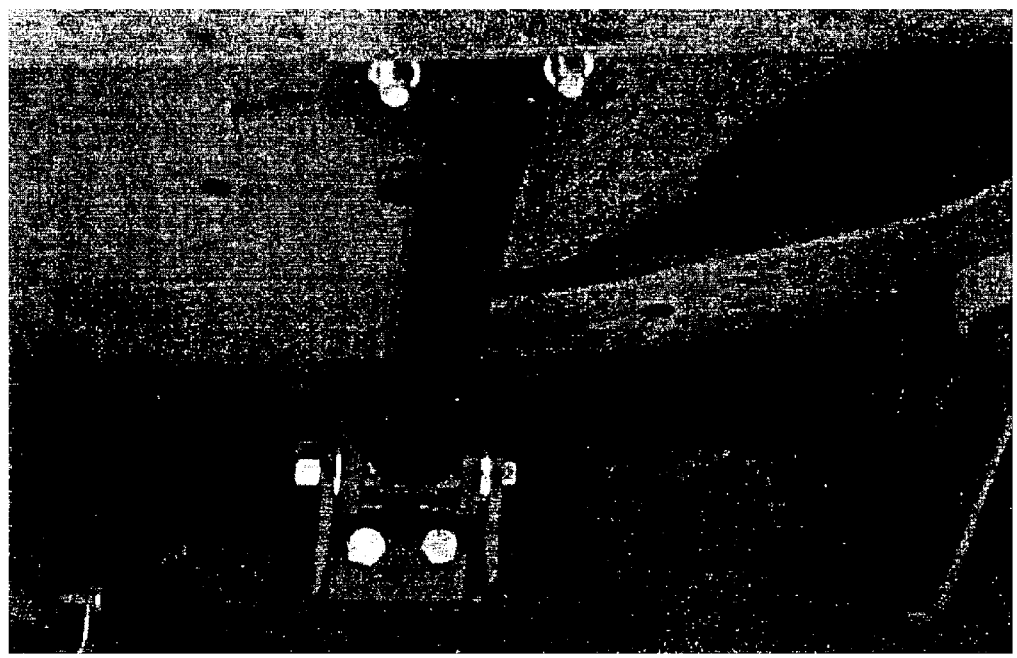
FIG. 27 shows a frame mount installed on a Jeep Wrangler™.
Figure 28:
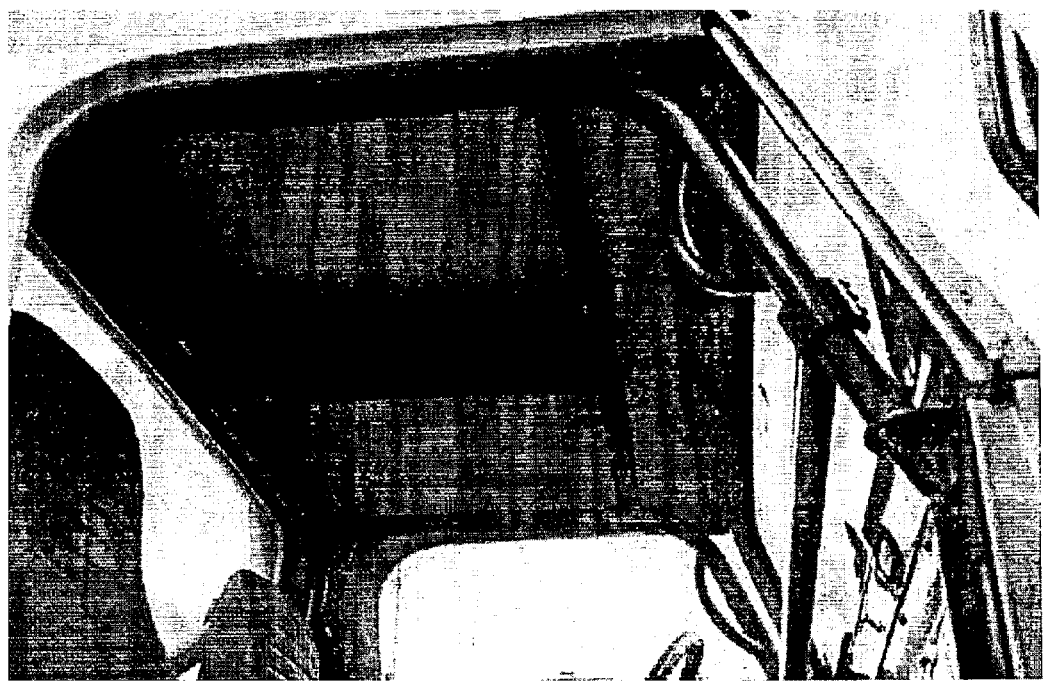
FIG. 28 shows a sport cage enhancement kit installed on a Jeep Scrambler™ model (hard top), complete with structural members (including the factory roll bar) and the attachment apparatus that attach them.
Figure 29:
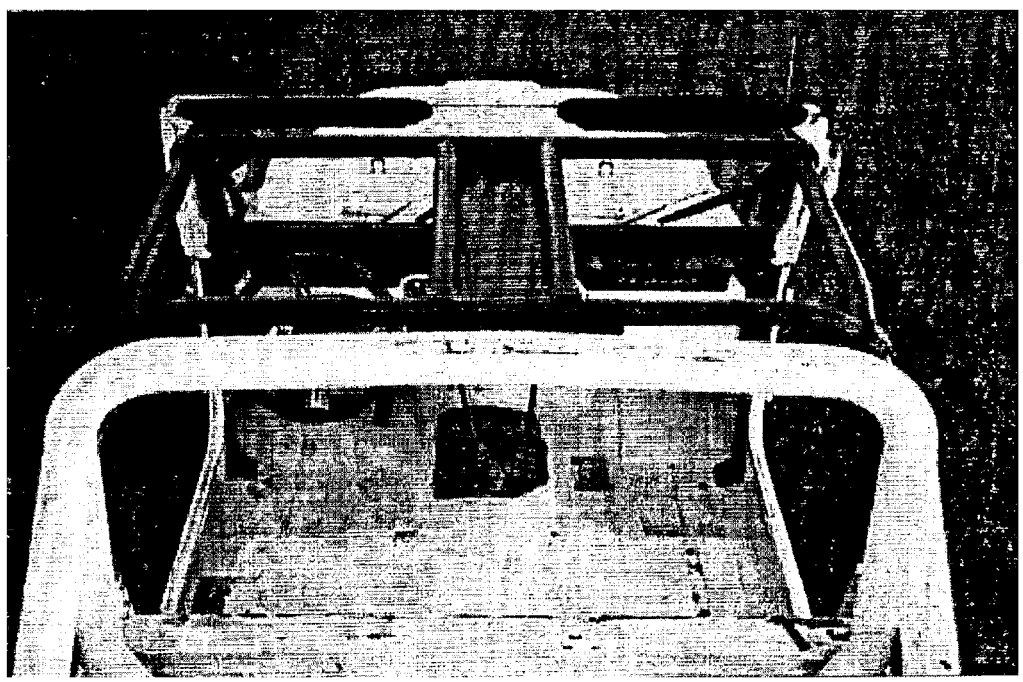
FIG. 29 shows a sport cage enhancement kit installed on a Jeep Scrambler™ model, complete with structural members (including the factory roll bar) and the attachment apparatus that attach them.
Figure 30:
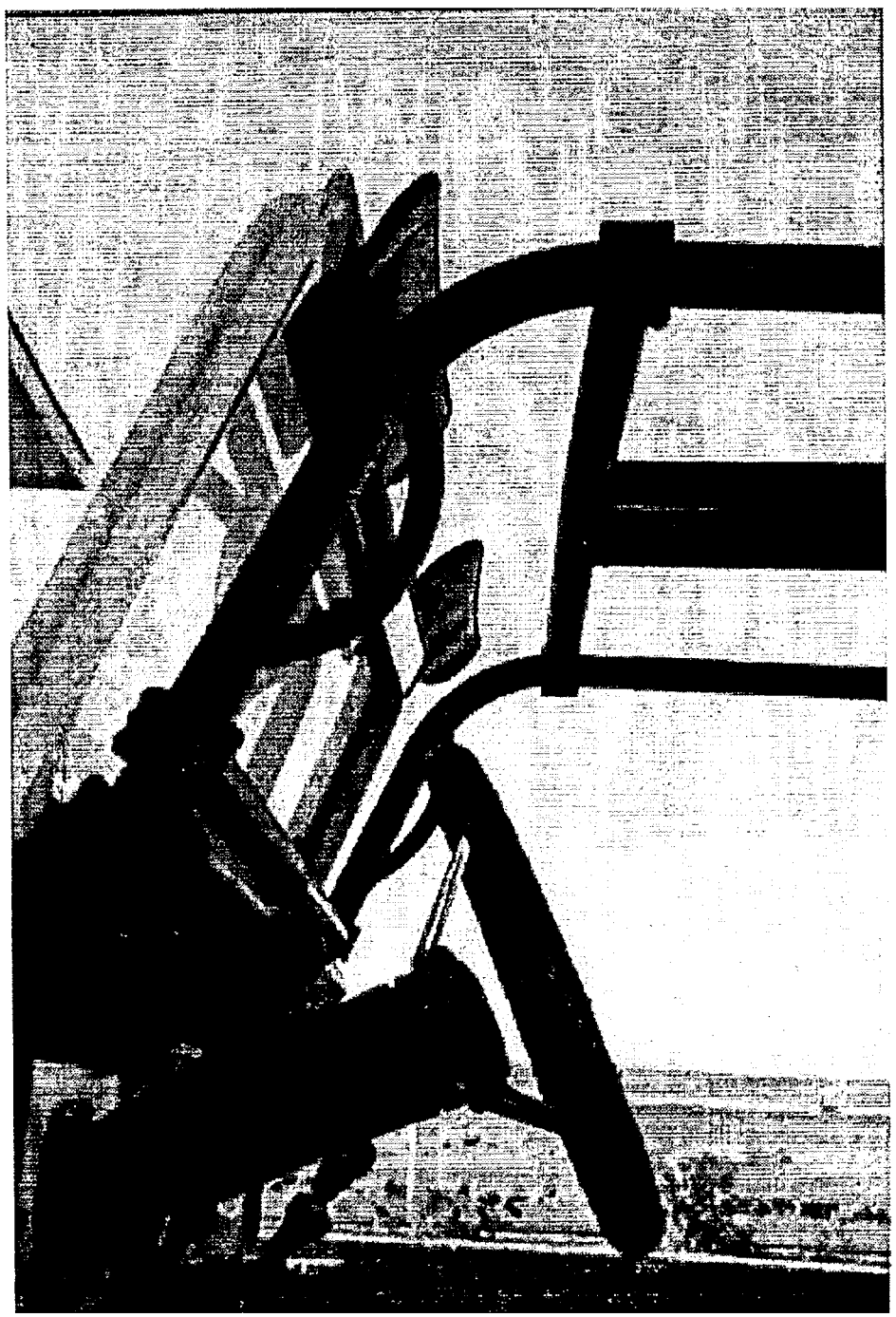
FIG. 30 shows the front section of a sport cage enhancement kit installed on a Jeep Scrambler™ model, complete with structural members and the attachment apparatus that attach them.
Figure 31:
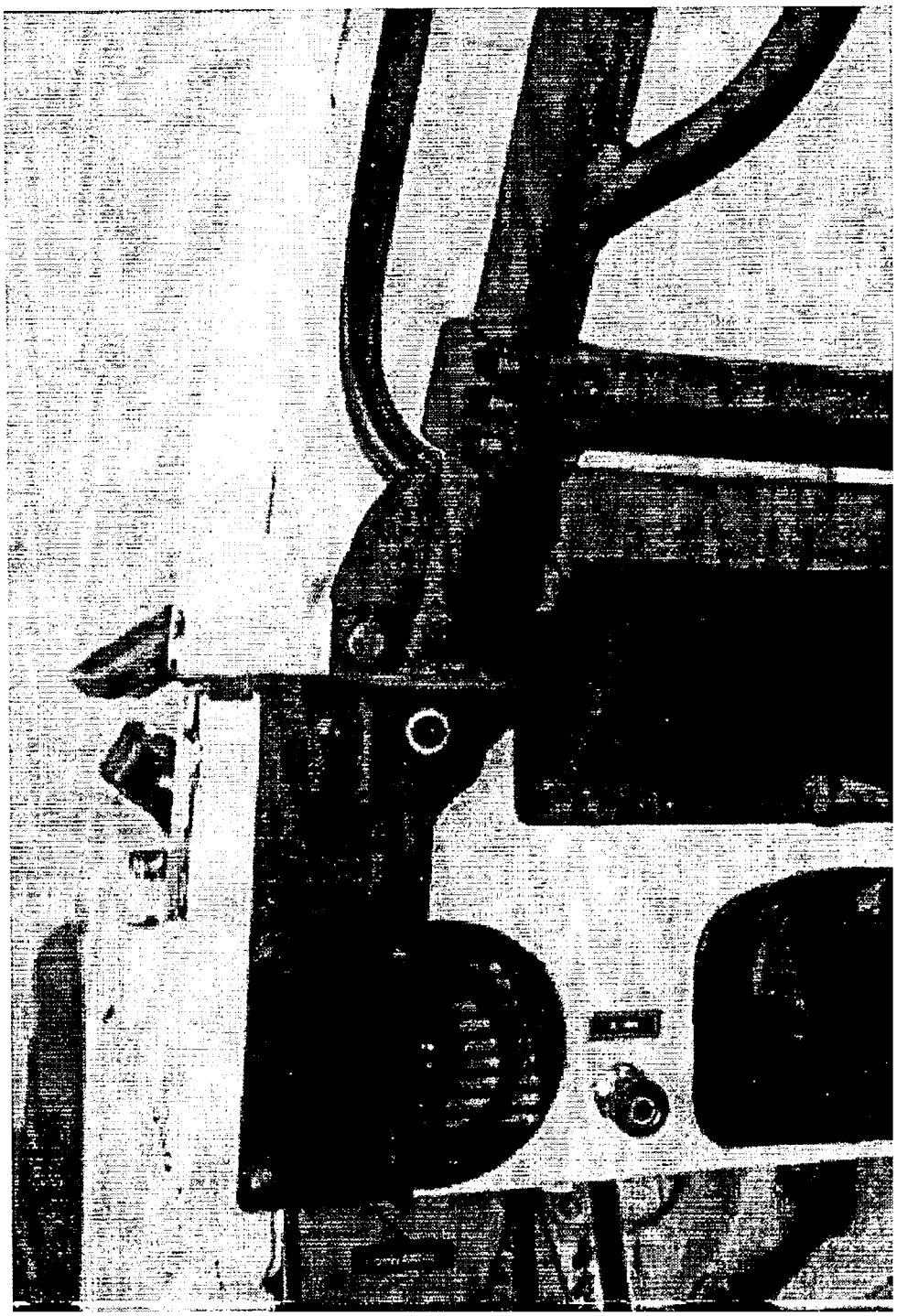
FIG. 31 shows a dashboard mount installed on a Jeep Scrambler™.
Figure 32:
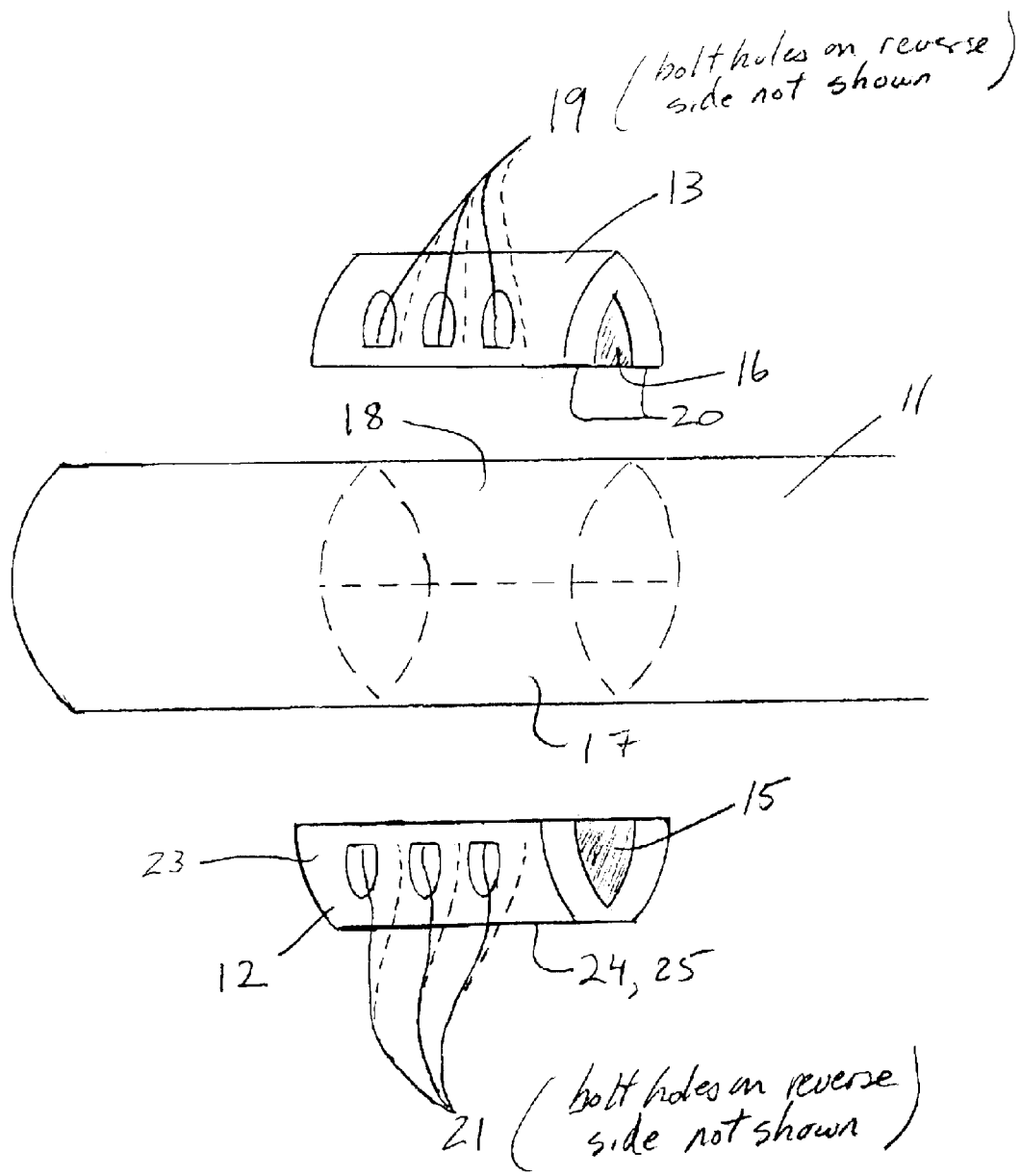
FIG. 32 shows two compressive retention elements and the second off-road vehicle occupant protection roll cage framework structural member externally of which the two compression elements are configured to be established when the structural member attachment apparatus is installed.

Another independent embodiment is a dashboard mount (or dash mount, see FIG. 17) or bracket that is located substantially in front of the dashboard instead of behind of the dashboard and to which may be connected via bolts or the like the top of the floor mount. The top of the floor mount may be bolted behind the dash to the dash mount such that the two mounts or brackets sandwich the dashboard structure. The dash mount may also be used in conjunction with a frame mount. The dash mount and floor mount may be connected such that they do not obstruct operation of any of the pedals or handles. The dash mount may constitute an invention unto itself, or it may be incorporated into any of the other embodiments mentioned herein. Methods corollary to this apparatus are also included as independent aspects of the invention.

Floor mounts, as mentioned above, may also be part of any embodiment of the invention. Floor mounts are substantially elongated metal attachment devices (see FIG. 19 for installed mount and FIG. 20 for unassembled mount) used to secure a part of the sport or roll cage to the floor, thereby providing extra support during a rollover and also enabling the provision of even further support with the installation of frame mounts. Floor mounts may be bracketed behind, to the side of, or in front of the dash alone or in conjunction with a dash mount or dash bracket, extend down to the floor, and be mounted to the floor using a bolt(s) through the drain hole (see FIGS. 19, and 21–23). Frame mounts may be attached at one end to the bottom portion of the floor mount below the floor and attached at a second end to the frame, and may include a bushing in the part of the frame mount located nearest the frame upon installation, for flex (see FIG. 24 for installed mount and FIG. 25 for unassembled mount).

Methods corollary to any apparatus disclosed herein are also included as independent aspects of the invention. They may include, but are not limited to, steps such as configuring, adapting, and establishing certain structural elements. Methods of using any of the apparatus disclosed herein are also included as independent aspects of the invention. These methods may include but are not limited to, steps such as obtaining, establishing, activating, and compressing certain structural elements. These methods of use include a method of using a structural member attachment apparatus to attach at least one end-attached off-road vehicle occupant protection roll cage framework structural member to at least one other off-road vehicle occupant protection roll cage framework structural member. This at least one other off-road vehicle occupant protection roll cage framework structural member may be an intermediately attached off-road vehicle occupant protection roll cage framework structural member, or it may be at least one other end-attached off-road vehicle occupant protection roll cage framework structural member. Of course, where it is at least one other end-attached off-road vehicle occupant protection roll cage framework structural member, the compressive retention elements may be established around or about two end-attached off-road vehicle occupant protection roll cage framework structural members. Again, the end attached structural member is attached at an end while the intermediately attached structural member is attached at a portion other than one of its ends. The end-attached off-road vehicle occupant protection roll cage framework structural member, may be viewed as a specific type of what has been nominated the first off-road vehicle occupant protection roll cage framework structural member while the intermediately attached off-road vehicle occupant protection roll cage framework structural member may be viewed as a specific type of what has been nominated the second off-road vehicle occupant protection roll cage framework structural member. Establishing two compressive retention elements externally of said at least one other off-road vehicle occupant protection roll cage framework structural member and substantially opposite one another refers to placing the two compressive retention elements externally of the indicated structural member and so that the two compressive retention elements are disposed in oppositely facing directions. Activating the at least two compression generation elements includes somehow operating the compression generation elements (as by rotating bolts and/or rotating about a hinge, e.g.) to compress the compressive retention elements onto the at least one other off-road vehicle occupant protection roll cage framework structural member; upon performing this activation step, the two compressive retention elements may be compressed oppositely one another (i.e., by converging towards one another, even if only slightly) and with enough pressure so as to prevent motion (including pivotal movement) of the structural member attachment apparatus (and any structural members that may be attached to it) relative to the another off-road vehicle occupant protection roll cage framework structural member. Further, the step of activating the at least two compression generation elements may be non-destructively reversible. Unscrewing a bolt is an example of non-destructive reversing of activation of that bolt while removing a rivet or cutting through a weld are examples of destructive reversal. Indeed, the step of activating the at least two compression generation elements may, in at least one embodiment, not comprise the step of structurally altering the intermediately attached off-road vehicle occupant protection roll cage framework structural member.

As can be easily understood from the foregoing, the basic concepts of the present invention may be embodied in a variety of ways. It involves both attachment techniques as well as devices to accomplish the appropriate attachment. In this application, the connection techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this provisional application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims which will be included in a full patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for the full patent application. It should be understood that such language changes and broad claiming will be accomplished when the applicant later (filed by the required deadline) seeks a patent filing based on this provisional filing. The subsequently filed, full patent application will seek examination of as broad a base of claims as deemed within the applicant's right and will be designed to yield a patent covering numerous aspects of the invention both independently and as an overall system. Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "connector" should be understood to encompass disclosure of the act of "connecting"—whether explicitly discussed or not—and, conversely, were there effectively disclosure of the act of "connecting", such a disclosure should be understood to encompass disclosure of a "connector" and even a "means for connecting" Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in a list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least: i) each of the connector and off-road vehicle occupant protection sport cage framework devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, x) the various combinations and permutations of each of the elements disclosed, find xi) each potentially dependent claim or concept as a dependency on each and every one of the independent claims or concepts presented. In this regard it should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

What is claimed is:

1. A structural member attachment apparatus usable to attach a first off-road vehicle occupant protection roll cage framework structural member to a second off-road vehicle occupant protection roll cage framework structural member, said structural member attachment apparatus comprising:

a first compressive retention element having a first compressive retention element inner surface adapted to apply a compressive force to at least a portion of an outer surface of a first bisecting half of said second off-road vehicle occupant protection roll cage framework structural member;

a second compressive retention element configured to oppositely face said first compressive retention element in an installed configuration and having a second compressive retention element inner surface adapted to apply a compressive force to at least a portion of an outer surface of a second bisecting half of said second off-road vehicle occupant protection roll cage framework structural member, wherein said at least a portion of the outer surface of said first bisecting half of said second off-road vehicle occupant protection roll cage framework structural member and said at least a portion of an outer surface of said second bisecting half of said second off-road vehicle occupant protection roll cage framework structural member are located on opposite off-road vehicle occupant protection roll cage framework structural member sides, diametrically opposite said at least a portion of an outer surface of said second bisecting half of said off-road vehicle occupant protection roll cage framework structural member;

at least two bolt holes located on opposite sides of said first compressive retention element, each bolt hole having a longitudinal axis substantially parallel to a line tangent to said outer surface of said second off-road vehicle occupant protection roll cage framework structural member, each penetrating a radial surface of said first compressive retention element, and each adapted for reception of a bolt; and at least two bolt holes located on opposite sides of said second compressive retention element, each bolt hole having a longitudinal axis substantially parallel to a line tangent to said outer surface of said second off-road vehicle occupant protection roll cage framework structural member each penetrating a radial surface of said second compressive retention element, and each adapted for reception of a bolt, wherein all said bolt holes enable engagement of said second compressive retention element with said first compressive retention element, and enable disengagement of said second compressive retention element from said first compressive retention element, wherein said longitudinal axis of each of said at least two bolt holes of said first compressive retention element are co-linear with the longitudinal axis of a different one of said at least two bolt holes of said second compressive retention element when said first compressive retention element is engaged with said second compressive retention element about at least a majority portion of the outer surface of said second off-road vehicle occupant protection roll cage framework structural member, and wherein said first compressive retention element comprises a first compressive retention member outer surface having an off-road vehicle occupant protection roll cage framework structural member interface.

2. A structural member attachment apparatus as described in claim 1, wherein the length of a cross-section of said at least a portion of said first compressive retention clement inner surface is greater than 40% of the length of the cross section of said outer surface of said second off-road vehicle occupant protection roll cage framework structural member.

3. A structural member attachment apparatus as described in claim 2, wherein said first compressive retention element having a first compressive retention element inner surface adapted to apply a compressive force to at least a portion of the outer surface of a first bisecting half of said second off-road vehicle occupant protection roll cage framework structural member comprises a first compressive retention element having a first compressive element inner surface adapted to apply said compressive force through direct contact.

4. A structural member attachment apparatus as described in claim 3, wherein said second compressive retention element having a second compressive retention element inner surface adapted to apply a compressive force to at least a portion of the outer surface of a second bisecting half of a second off-road vehicle occupant protection roll cage framework structural member comprises a second compressive retention element having a second compressive element inner surface adapted to apply said compressive force through direct contact.

5. A structural member attachment apparatus as described in claim 4, wherein said first compressive retention element has a substantially bisected cylinder shape.

6. A structural member attachment apparatus as described in claim 5, wherein said second compressive retention element has a substantially bisected cylinder shape.

7. A structural member attachment apparatus as described in claim 6, wherein said at least a portion of the outer surface of a second bisecting half of a second off-road vehicle occupant protection roll cage framework structural member and said at least a portion of the outer surface of a second bisecting half of a second off-road vehicle occupant protection roil cage framework structural member are diametrically opposite one another.

8. A structural member attachment apparatus as described in claim 1, wherein said off-road vehicle occupant protection roll cage framework that comprises said first off-road vehicle occupant protection roll cage framework structural member does not require structural modification for attachment to a pre-existing structure.

9. A structural member attachment apparatus as described in claim 7, wherein said off-road vehicle occupant protection roll cage framework structural member interface comprises a flat off-road vehicle occupant protection roll cage framework structural member interface.

10. A structural member attachment apparatus as described in claim 9, further comprising bolts configured to pass through said at least two bolt holes and to threadedly engage said at least two threaded bolt holes.

11. A structural member attachment apparatus as described in claim 10, further comprising said first off-road vehicle occupant protection roll cage framework structural member.

12. A structural member attachment apparatus as described in claim 11 wherein said first off-road vehicle occupant protection roll cage framework structural member is permanently attached at said off-road vehicle occupant protection roll cage framework structural member interface.

13. A structural member attachment apparatus as described in claim 10, farther comprising the off-road vehicle occupant protection roll cage framework that comprises said second off-road vehicle occupant protection roll framework structural member.

14. A structural member attachment apparatus as described in claim 13, further comprising the off-road vehicle to which said off-road vehicle occupant protection roll cage framework is attached.

15. A structural member attachment apparatus usable to attach a first off-road vehicle occupant protection roll cage framework structural member to a second off-road vehicle occupant protection roll cage framework structural member, said structural member attachment apparatus comprising:
 a first compressive retention element having a first compressive retention element inner surface;
 a second compression retention element responsive to said first compressive retention element in an installed configuration and having a second compressive retention element inner surface;
 at least two first compression generation elements to which said first compressive retention element is compressively responsive; and
 at least two second compression generation elements to which said second compressive retention element is compressively responsive and that, together with said at least two first compression generation elements, enable engagement of said second compressive retention element with said first compressive retention element, and enable disengagement of said second compressive retention element from said first compressive retention element,
wherein at least a portion of said first compressive retention element inner surface is configured to apply a compressive retention force to a least a first portion of said second off-road vehicle occupant protection roll cage framework structural member during activation of said first and second compression generation elements,
wherein at least a portion of said second compressive retention element inner surface is configured to apply a compressive retention force to at least a second portion of said second off-road vehicle occupant protection roll cage framework structural member during activation of said first and second compression generation elements,
wherein said at least a first portion and said at least a second portion of said second off-road vehicle occupant protection roll cage framework structural member are located on opposite off-road vehicle occupant protection roll cage framework structural member sides,
wherein said first compressive retention element comprises a compressive retention member outer surface having an off-road vehicle occupant protection roll cage framework structural member interface,
wherein said at said least two first compression generation elements are established on opposite sides of said first compressive retention element, and
wherein said at least two second compression generation elements are established on opposite sides of said second compressive retention element.

16. A structural member attachment apparatus as described in claim 15 wherein said at least two first compression generation elements comprise at least two threaded holes.

17. A structural member attachment apparatus as described in claim 16, wherein at least two second compression generation elements comprise at least two bolt pass-through holes.

18. A structural member attachment apparatus as described in claim 15, wherein said at least two second compression generation elements comprise at least two threaded holes.

19. A structural member attachment apparatus as described in claim 18, wherein said at least two first compression generation elements comprise at least two bolt pass-through holes.

20. A structural member attachment apparatus as described in claim 16 or 18, wherein said threaded holes are threaded through-holes.

21. A structural member attachment apparatus as described in claim 16 or 18, further comprising bolts that are threadedly engageable with said at least two threaded holes.

22. A structural member attachment apparatus as described in claim 15, further comprising said first off-road vehicle occupant protection roll cage framework structural member permanently attached at said off-road vehicle occupant protection roll cage framework structural member interface.

23. A structural member attachment apparatus as described in claim 15, wherein said at least a portion of said first compressive retention element inner surface and said at least a portion of said first compressive retention element inner surface are configured to apply a compressive retention force to said at least a first and a second portion, respectively, of said second off-road vehicle occupant protection roll cage framework structural member through direct contact with amid at least a first and a second portion, respectively, of said second off-road vehicle occupant protection roll cage framework structural member.

24. A structural member attachment apparatus as described in claim 15 or 23, wherein the length of a cross-section of said at least a portion of said first compressive retention element inner surface is greater than 40% of the length of the cross section of the outer surface of said second off-road vehicle occupant protection roll cage framework structural member.

25. A structural member attachment apparatus as described in claim 15 or 23, wherein the length of a cross-section of said at least a portion of said second compressive retention element inner surface is greater than 40% of the length of the cross section of the outer surface of said second off-road vehicle occupant protection roll cage framework structural member.

26. A structural member attachment apparatus as described in claim 15, wherein said at least two first compression generation elements and said at least two second compression generation elements each comprise at least two holes.

27. A structural member attachment apparatus as described in claim 26, wherein said at least two holes each have an axis that is parallel to a line that is tangent to the outer surface of said second off-road vehicle occupant protection roll cage framework structural member.

28. A structural member attachment apparatus as described in claim 15, wherein said at least a first and said at least a second portion of said second off-road vehicle occupant protection roll cage framework structural member located on opposite oft-road vehicle occupant protection roll cage framework structural member sides are located diametrically opposite one another.

29. A structural member attachment apparatus as described in claim 15, further comprising said first off-road vehicle occupant protection roll cage framework structural member.

30. A structural member attachment apparatus as described in claim 15, further comprising the off-road vehicle occupant protection roll cage framework that comprises said first off-road vehicle occupant protection roll cage framework structural member.

31. A structural member attachment apparatus as described in claim 15, further comprising the off-road vehicle to which said off-road vehicle occupant protection roll cage framework is attached.

32. A structural member attachment apparatus as described in claim 15, wherein said first off-road vehicle occupant protection roll cage framework structural member is adjustable with respect to said off-road vehicle occupant protection roll cage framework.

33. A structural member attachment apparatus as described in claim 15, wherein said off-road vehicle occupant protection roll cage framework that comprises said first off-road vehicle occupant protection roll cage framework structural member does not require structural modification for attachment to pre-existing structures.

34. A structural member attachment apparatus as described in claim 15, wherein said off-road vehicle occupant protection roll cage framework structural member interface comprises a flat off-road vehicle occupant protection roll cage framework structural member interface.

35. A structural member attachment apparatus as described in claim 15, wherein one of said at least two first compression generation elements is a first hinge part and wherein one of said at least two second compression generation elements is a second hinge part engageable with said first hinge part.

36. An off-road vehicle occupant protection roll cage framework structural member attachment method comprising the steps of:
    configuring a first compressive retention element to have a first compressive retention element inner surface;
    configuring a second compression retention element to be responsive to said first compressive retention clement in an installed configuration and to have a second compressive retention element inner surface;
    establishing at least two first compression generation elements to which said first compressive retention element is compressively responsive;
    establishing at least two Second compression generation elements to which said second compressive retention element is compressively responsive and so that said at least two second compression generation elements, together with said at least two first compression generation elements, enable engagement of said second compressive retention element with said first compressive retention element, and enable disengagement of said second compressive retention element from said first compressive retention element;
    configuring at least a portion of said first compressive retention element inner surface to apply a compressive retention force to at least a first portion of a second off-road vehicle occupant protection roll cage framework structural member upon activation of said first and second compression generation elements;
    configuring at least a portion of said second compressive retention element inner surface to apply a compressive retention force to at least a second portion of said second off-road vehicle occupant protection roll cage framework structural member during activation of said first and second compression generation elements,
    wherein said at least a first portion and said at least a second portion of said second off-road vehicle occupant protection roll cage framework structural member are located on opposite off-road vehicle occupant protection roll cage framework structural member sides;
    configuring said first compressive retention element to have a compressive retention member outer surface that has an off-road vehicle occupant protection roll cage framework structural member interface for attachment of a first off-road vehicle occupant protection roll cage framework structural member;
    establishing said least two first compression generation elements on opposite sides of said first compressive retention element; and
    establishing said at least two second compression generation elements on opposite sides of said second compressive retention element.

37. An off-road vehicle occupant protection roll cage framework structural member attachment method as described in claim 36, wherein said step of establishing said at least two first compression generation elements comprises the step of establishing at least two threaded holes.

38. An off-road vehicle occupant protection roll cage framework structural member attachment method as described in claim 37, wherein said step of establishing at least two second compression generation elements comprises the step of establishing at least two bolt pass-through holes.

39. An off-road vehicle occupant protection roll cage framework structural member attachment method as described in claim 36, wherein said step of establishing said at least two second compression generation elements comprises the step of establishing at least two threaded holes.

40. An off-road vehicle occupant protection roll cage framework structural member attachment method as described in claim 39, wherein said step of establishing at least two first compression generation elements comprises the step of establishing at least two bolt pass-through holes.

41. An off-road vehicle occupant protection roll cage framework structural member attachment method as described in claim 36 or 39, wherein said step of establishing at least two threaded holes comprises the step of establishing at least two threaded through-holes.

42. An off-road vehicle occupant protection roll cage framework structural member attachment method as described in claim 36, further comprising the step of providing bolts that are threadedly engageable with said threaded holes.

43. An off-road vehicle occupant protection roll cage framework structural member attachment method as described in claim 36, further comprising the step of permanently attaching said first off-road vehicle occupant protection roll cage framework structural member at said off-road vehicle occupant protection roll cage framework structural member interface.

44. An off-road vehicle occupant protection roll cage framework structural member attachment method as described in claim 36, wherein said step of configuring each said at least a portion of said first compressive retention element inner surface and said at least a portion of said second compressive retention element inner surface to apply a compressive retention force to at least a first and second portion, respectively, of said second off-road vehicle occupant protection roll cage framework structural member comprises the step of applying said compressive retention force through direct contact with said at least a first and a second portion, respectively, of said second outer surface of a off-road vehicle occupant protection roll cage framework structural member upon activation of said first and second compression generation elements.

45. An off-road vehicle occupant protection roll cage framework structural member attachment method as described in claim 36 or 44, wherein the length of a cross-section of said at least a portion of said first compressive retention element inner surface is greater than 40% of the length of the cross section of the outer surface of said second off-road vehicle occupant protection roll cage framework structural member.

46. An off-road vehicle occupant protection roll cage framework structural member attachment method as described in claim 36 or 44, wherein the length of a cross-section of said at least a portion of said second compressive retention element inner surface is greater than 40% of the length of the cross-section of the outer surface of said second off-road vehicle occupant protection roll cage framework structural member.

47. An off-road vehicle occupant protection roll cage framework structural member attachment method as described in claim 36, wherein each said step of establishing said at least two first compression generation elements and said step of establishing said at least two second compression generation elements comprises the step of establishing at least two holes.

48. An off-road vehicle occupant protection roll cage framework structural member attachment method as described in claim 47, wherein said step of establishing at least two holes comprises the step of establishing at least two holes to each have an axis that is parallel to a line that is tangent to the outer surface of said second off-road vehicle occupant protection roll cage framework structural member.

49. An off-mad vehicle occupant protection roll cage framework structural member attachment method as described in claim 36, wherein said at least a first and said at least a second portion of said off-road vehicle occupant protection roll cage framework structural member located on opposite off-road vehicle occupant protection roll cage framework structural member sides are located diametrically opposite one another.

50. An off-road vehicle occupant protection roll cage framework structural member attachment method as described in claim 36, further comprising said second off-road vehicle occupant protection roll cage framework structural member.

51. An off-road vehicle occupant protection roll cage framework structural member attachment method as described in claim 36, further comprising the off-road vehicle occupant protection roll cage framework that comprises said first off-road vehicle occupant protection roll cage framework structural member.

52. An off-road vehicle occupant protection roll cage framework structural member attachment method as described in claim 36, further comprising the off-road vehicle to which said off-road vehicle occupant protection roll cage framework is attached.

53. An off-road vehicle occupant protection roll cage framework structural member attachment method as described in claim 36, further comprising the step of establishing said first off-road vehicle occupant protection roll cage framework structural member so as to be adjustable with respect to said off-road vehicle occupant protection roll cage framework.

54. An off-road vehicle occupant protection roll cage framework structural member attachment method as described in claim 36, wherein said off-road vehicle occupant protection roll cage framework that comprises said first off-road vehicle occupant protection roll cage framework structural member does not require structural modification for attachment to pro-existing structures.

55. An off-road vehicle occupant protection roll cage framework structural member attachment method as described in claim 36, wherein said step of configuring said first compressive retention element to have a first compressive retention member outer surface that has a off-road vehicle occupant protection roll cage framework structural member interface comprises the step of configuring said first compressive retention element to have a first compressive retention member outer surface that has a flat off-road vehicle occupant protection roll cage framework structural member interface.

56. An off-road vehicle occupant protection roil cage framework structural member attachment method as described in claim 36, wherein said step of establishing at least two first compression generation elements comprises the step of establishing a first hinge part and wherein said step of establishing at least two second compression generation elements comprises the step of establishing a second hinge part engageable with said first hinge part.

57. An off-road vehicle occupant protection roll cage framework structural member attachment method as described in claim 36, further comprising said first off-road vehicle occupant protection roll cage framework structural member permanently attached at said off-road vehicle occupant protection roll cage framework structural member interface.

58. A method of using a structural member attachment apparatus to attach at least one end-attached off-road vehicle occupant protection roll cage framework structural member to at least one other off-road vehicle occupant protection roll cage framework structural member, maid method comprising the steps of:
  obtaining two compressive retention elements that each comprises at least two compression generation elements;
  establishing said two compressive retention elements externally of said at least one other off-road vehicle occupant protection roll cage framework structural member and substantially oppositely one another;
  activating said at least two compression generation elements;
  compressing said two compressive retention elements oppositely one another and onto said at least one other off-wad vehicle occupant protection roll cage framework structural member upon performing the step of activating said at least two compression generation elements and so as to prevent motion of said structural member attachment apparatus relative to said at least one other off-road vehicle occupant protection roll cage framework structural member, wherein said step of activating said at least two compression generation elements is non-destructively reversible.

59. A method of using a structural member attachment apparatus as described in claim 58 wherein said step of obtaining two compressive retention elements comprises the step of obtaining two compressive retention elements to at least one of which is permanently attached a terminal end of said end-attached off-road vehicle occupant protection roll cage framework structural member.

60. A method of using a structural member attachment apparatus as described in claim 58, further comprising the step of permanently attaching a terminal end of said end-attached off-road vehicle occupant protection roll cage framework structural member.

61. A method of using a structural member attachment apparatus as described in claim 58 wherein said step of activating said at least two compression generation elements does not comprise the step of structurally altering said at least one other off-road vehicle occupant protection roll cage framework structural member.

62. A method of using a structural member attachment apparatus as described in claim 58, wherein said step of activating said at least two compression generation elements comprises the step of rotating at least two bolts so as to engage threaded bolt holes.

63. A method of using a structural member attachment apparatus as described in claim 58, wherein said step of activating said at least two compression generation elements comprises the steps of rotating at least one bolt so as to engage a threaded bolt hole and rotating said two compressive retention elements about a hinge.

64. A method of using a structural member attachment apparatus as described in claim 58, wherein said step of establishing said two compressive retention elements externally of said at least one other off-road vehicle occupant protection roll cage framework structural member comprises the step of establishing said two compressive retention elements externally of an intermediately attached off-road vehicle occupant protection roll cage framework structural member.

\* \* \* \* \*